US011297186B2

(12) United States Patent
Baker et al.

(10) Patent No.: US 11,297,186 B2
(45) Date of Patent: Apr. 5, 2022

(54) SYSTEM, APPARATUS AND METHOD FOR MEDIA COMMUNICATION BETWEEN PARTIES

(71) Applicant: Sorenson IP Holdings, LLC, Salt Lake City, UT (US)

(72) Inventors: Daniel Baker, West Jordan, UT (US); Jason Briggs, South Jordan, UT (US); Steve Saunders, Kaysville, UT (US); Amy Benich, Draper, UT (US); Isaac Roach, Salt Lake City, UT (US); Mark Grossinger, Draper, UT (US); David Lance Pickett, Eagle Mountain, UT (US); Thomas Hawkes, Sandy, UT (US); Kevin Selman, Kaysville, UT (US)

( * ) Notice: Subject to any disclaimer, the term of this patent is extended or adjusted under 35 U.S.C. 154(b) by 0 days.

(21) Appl. No.: 16/816,233

(22) Filed: Mar. 11, 2020

(65) Prior Publication Data
US 2021/0289072 A1 Sep. 16, 2021

(51) Int. Cl.
*H04M 3/56* (2006.01)
*H04N 7/15* (2006.01)
*H04N 7/14* (2006.01)

(52) U.S. Cl.
CPC ............ *H04M 3/567* (2013.01); *H04N 7/147* (2013.01); *H04N 7/152* (2013.01)

(58) Field of Classification Search
CPC ........ H04M 3/567; H04N 7/147; H04N 7/152
See application file for complete search history.

(56) References Cited

U.S. PATENT DOCUMENTS

| 7,010,315 | B1* | 3/2006 | Pan | H04W 72/005 455/519 |
| 7,016,479 | B2 | 3/2006 | Flathers et al. | |
| 7,142,642 | B2* | 11/2006 | McClelland | H04M 3/42391 379/52 |
| 7,492,730 | B2* | 2/2009 | Eshel | H04L 12/1822 348/14.08 |
| 8,610,755 | B2 | 12/2013 | Brooksby et al. | |
| 8,941,712 | B2* | 1/2015 | Wamorkar | H04L 65/605 348/14.09 |

(Continued)

*Primary Examiner* — Philip J Chea
*Assistant Examiner* — Robert B McAdams

(57) ABSTRACT

Systems, apparatuses, and methods for enabling communication between parties are disclosed. A system may include a first communication device associated with a first user and a second communication device associated with a second user. The system may include a first communication channel between the first user and the second user for transmitting call data between the first communication device and the second communication device. The system may include a second communication channel between the first user and the second user established concurrently with the first communication channel. The second communication channel may be separate from the first communication channel. The second communication channel may be established by connection of the communication session participants to a multipoint control unit that is configured to transmit media data between the first communication device and the second communication device. The system allows transmission of one or more types of call data to be switched between the first and second communication channels.

41 Claims, 9 Drawing Sheets

(56) References Cited

U.S. PATENT DOCUMENTS

| | | |
|---|---|---|
| 8,989,355 B2 | 3/2015 | Barton et al. |
| 9,374,536 B1 * | 6/2016 | Nola ................ H04M 1/72478 |
| 9,635,174 B1 * | 4/2017 | Montero ........... H04M 3/42306 |
| 10,127,833 B1 * | 11/2018 | Utley ................ H04L 65/1089 |
| 10,134,395 B2 * | 11/2018 | Typrin .................... G10L 17/00 |
| 2005/0086699 A1 | 4/2005 | Hahn |
| 2005/0094777 A1 | 5/2005 | McClelland |
| 2006/0285652 A1 | 12/2006 | McClelland et al. |
| 2007/0057912 A1 | 3/2007 | Romriell et al. |
| 2007/0064097 A1 | 3/2007 | Cupal et al. |
| 2007/0064894 A1 * | 3/2007 | Armstrong ........ H04M 3/42391 379/142.07 |
| 2012/0196580 A1 | 8/2012 | Simmons et al. |
| 2012/0212567 A1 | 8/2012 | Brooksby et al. |
| 2012/0269331 A1 | 10/2012 | Harris et al. |
| 2013/0337786 A1 | 12/2013 | Park |
| 2015/0139459 A1 | 5/2015 | Olsen et al. |
| 2016/0277572 A1 * | 9/2016 | Benich ................ H04L 65/1046 |

\* cited by examiner

SYSTEM, APPARATUS AND METHOD FOR MEDIA COMMUNICATION BETWEEN PARTIES

TECHNICAL FIELD

The application relates generally to media phone communication systems, and more specifically, to systems, apparatuses, and methods for providing simultaneous visual and audio communication between an audibly-capable person and an audibly-impaired person using separate communication channels.

BACKGROUND

Traditional communication systems, such as standard and cellular telephone systems, enable verbal communications between people at different locations. Communication systems for audibly-impaired individuals (e.g., individuals with hearing impairments, speech impairments, or a combination thereof) may also enable non-audible communications instead of, or in addition to, verbal communications. Some communication systems for audibly-impaired individuals enable communications between communication devices for audibly-incapable individuals (e.g., video phones, web cameras, etc.) and communication systems for audibly-capable individuals (e.g., standard telephones, cellular phones, etc.). For example, a video relay service (VRS) may provide speech to sign language translation services, and sign language to speech translation services for a communication session between a video communication device for an audibly-impaired individual and a traditional communication device for an audibly-capable user. In other words, the VRS may be used to facilitate a conversation between an audibly-impaired user and an audibly-capable person.

In a VRS, the audibly-impaired individual may communicate with a call assistant (e.g., communicate via sign language), and then the call assistant conveys the message audibly to a far-end user (e.g., an audibly-capable user). For communication in the other direction, the call assistant listens to the audibly-capable user and then signs what was spoken to the audibly-impaired user. The call assistant may, therefore, act as a translator for both the audibly-impaired user (e.g., using sign language) and the far-end user (e.g., communicating via speech communication). Thus, the call assistant directly communicates with each of the audibly-impaired individual and the audibly-capable individual to facilitate communication between the audibly-impaired individual and the audibly-capable individual. However, because the audibly-impaired individual and the audibly-capable individual do not directly communicate with each other, contextual cues (e.g., body language, tone of voice, etc.) may not be expressed or otherwise conveyed to the other party. Elements of communication, including emotions (e.g., happiness, sadness, excitement, frustration, etc.) and emotional connections between the audibly-impaired individual and the audibly-capable individual, may not be expressed or otherwise conveyed to the other party and the communication session may be less than desirable.

SUMMARY

Embodiments described herein include systems, apparatuses and methods for communication between a an audibly-impaired user and an audible-capable user. In one embodiment, this may be accomplished by establishing a first communication channel. The first communication channel may include a relay system. A second communication channel may be simultaneously established for video data transmission.

Embodiments of the disclosure include a system for enabling communication between parties. The system includes a first communication device associated with a first user and a second communication device associated with a second user. The system in one embodiment is comprises a first communication channel between the first user and the second user. The first communication channel transmits call data between the first communication device and the second communication device. The system may also include a second communication channel between the first user and the second user. The system is configured such that the second communication channel is established concurrently with, and is separate from, the first communication channel. The second communication channel in one embodiment is a direct communication over a media transmission line between the first user and the second user. In another embodiment, the second communication channel may include a Multipoint Control Unit (MCU) and is configured to transmit media data, including video data, between the first communication device and the second communication device when both parties are connected to the MCU.

In one embodiment, the first communication channel comprises a relay system for providing translation services during a communication session between the first user and the second user, one of which may be audibly impaired. The relay system includes a call assistant station device associated with a call assistant or translator. Thus, the first communication channel in one embodiment includes a leg between the first communication device and the call assistant station device and a second leg between the call assistant station device and the second communication device. In this embodiment, the first communication channel operates like the VRS described above and the call data transmitted over the first communication channel includes at least video data transmitted between the first communication device and the call assistant station device and voice data transmitted between second communication device and the call assistant station device.

The system may switch the transmission of video data from the first communication channel leg between the first communication device and the call assistant station device to the second communication channel leg between the MCU and the call assistant station device. In one embodiment, the video feed between the first communication device and the call assistant station device remains established but may be paused until such time as the second communication channel is terminated. Then the video feed between the first communication device and the call assistant station device may be easily unpaused with minimal interruption to the overall communication session between the first and second user. In this configuration, the second active communication channel may be used to perform administrative tasks like interpreter "handoffs" that appear to be in the background to those visually communicating over the other communication channel. This preservation of the first communication channel, which may be operating as a VRS, when the first communication channel includes the relay system, reduces interruption to the parties on the call and enhances their experience, among other things.

Also disclosed are communication devices for audibly-impaired and audibly capable users. The communication devices are used to facilitate a communication session between an audibly-impaired user and an audibly-capable user. The communication devices include a memory configured to store instructions and a processor operatively coupled with the memory. The processor is configured to execute the instructions to perform operations including requesting a communication session between audibly-impaired user's communication device and the audibly-impaired communication device. The operations may also include establishing a first communication channel and a second communication between the users simultaneously. The operations further include the ability for the communication devices to terminate the communication session.

As discussed above, the first communication channel may include a video relay system comprising a call assistant station device associated with a call assistant for providing translation services over the first communication channel during the communication session. The first communication channel may be configured to transmit call data between the parties. More specifically, the first communication channel may be configured to transmit voice data between the hearing-capable user's device and the call assistant station device and at least video data between the audibly-impaired user's device and the call assistant station device. In one embodiment, the first communication channel may be configured to transmit video data, audio data including voice data, and typed data including texts between the audibly-impaired user's device and the call assistant station device. The second communication channel, in one embodiment, may include an MCU and be configured to transmit video data between the audibly-impaired user's communication device and the audibly-capable user's communication device. In one embodiment the communication devices allow one party to see the other party and the call assistant simultaneously on a communication device display. In yet another embodiment, the communication devices allow each party to see themselves, the other party, and the call assistant simultaneously on the communication device's display.

Also included are methods of communication between parties, including audibly-impaired users and an audibly-capable users using communication devices. The method may include a step of determining whether a communication session between the communication devices is desired. The method may then establish a first communication channel between a first communication device associated with a first user and a second communication device associated with a second user. The first communication channel may be configured to transmit call data between the first communication device and the second communication device. In one embodiment, the method includes the step of establishing a second communication channel between the first communication device and the second communication device concurrently with the first communication channel. The second communication channel, in one embodiment, is separate from the first communication channel. The second communication channel may include an MCU and be configured to transmit video data between the first communication device and the second communication device. The method may also include the step of switching between the first and second communication channels in order to selectively transmit video data between the first communication device and the call assistant station device over both the channels or either one of the communication channels. The method may include the step of terminating the communication session between the users.

A system is also disclosed having memory and processor for carrying out instructions stored on the memory. The instructions may include those necessary to carry out the methods of communication described herein and the functionality of the system or system components described herein.

DETAILED DESCRIPTION

Figure 1:
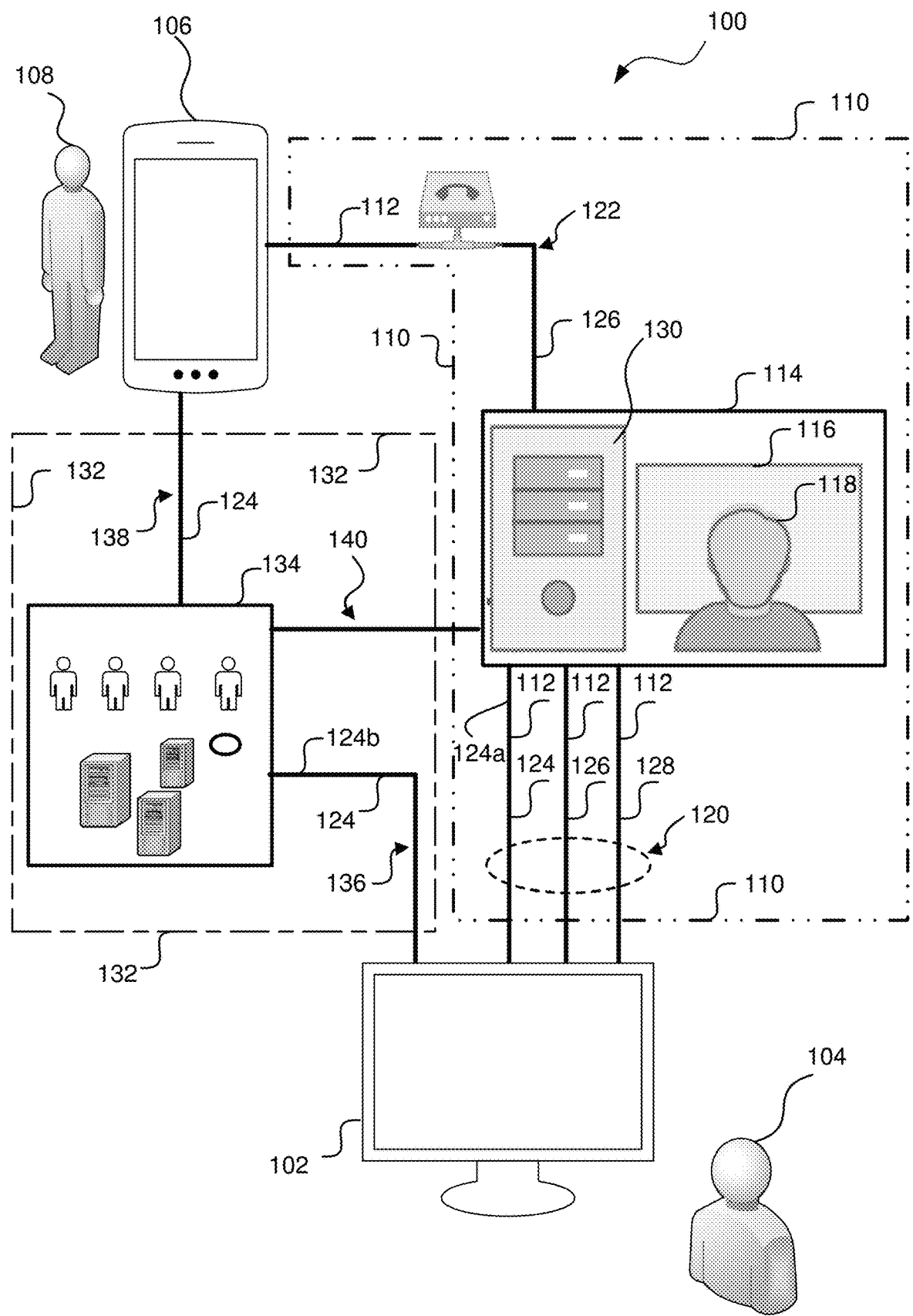
FIG. 1 is a simplified schematic diagram of a communication system configured to enable media communication between parties in accordance with one or more embodiments of the disclosure.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures. Furthermore, all or a portion of any embodiment disclosed herein may be utilized with all or a portion of any other embodiment, unless stated otherwise.

In addition, it is noted that the embodiments may be described in terms of a process that is depicted as method steps, a flowchart, a flow diagram, a schematic diagram, or a block diagram. Although a flowchart, process, or method may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in this disclosure should not be interpreted as excluding the embodiments of the disclosure. Additional term usage is described below to assist the reader in understanding the disclosure.

The terms "have," "may have," "include," and "may include" as used herein indicate the presence of corresponding features (for example, elements such as numerical values, functions, operations, or parts), and do not preclude the presence of additional features.

The word "exemplary" is used herein to mean "serving as an example or illustration." Any aspect or design described herein as "exemplary" is not necessarily to be construed as preferred or advantageous over other aspects or designs.

The terms "A or B," "at least one of A and B," "one or more of A and B", or "A and/or B" as used herein include all possible combinations of items enumerated with them. For example, use of these terms, with A and B representing different items, means: (1) including at least one A; (2) including at least one B; or (3) including both at least one A and at least one B. In addition, the articles "a" and "an" as used herein should generally be construed to mean "one or more" unless specified otherwise or clear from the context to be directed to a singular form.

Terms such as "first," "second," and so forth are used herein to distinguish one component from another without limiting the components and do not necessarily reflect importance, quantity, or an order of use. For example, a first user device and a second user device may indicate different user devices regardless of the order or importance. Furthermore, a reference to first and second elements does not mean that only two elements may be employed there or that the first element must precede the second element in some manner. Also, unless stated otherwise a set of elements may comprise one or more elements.

It will be understood that, when two or more elements are described as being "coupled", "operatively coupled", "in communication", or "in operable communication" with or to each other, the connection or communication may be direct, or there may be an intervening element between the two or more elements. To the contrary, it will be understood that when two or more elements are described as being "directly" coupled with or to another element or in "direct communication" with or to another element, there is no intervening element between the first two or more elements.

Furthermore, "connections" or "communication" between elements may be, without limitation, wired, wireless, electrical, mechanical, optical, chemical, electrochemical, comparative, by sensing, or in any other way two or more elements interact, communicate, or acknowledge each other. It will further be appreciated that elements may be "connected" with or to each other, or in "communication" with or to each other by way of local or remote processes, local or remote devices or systems, distributed devices or systems, or across local or area networks, telecommunication networks, the Internet, other data communication networks conforming to a variety of protocols, or combinations of any of these. Thus, by way of non-limiting example, units, components, modules, elements, devices and the like may be "connected', or "communicate" with each other locally or remotely by means of a coaxial cable, fiber optic cable, twisted pair, digital subscriber line (DSL), shared chipset or wireless technologies such as infrared, radio, and microwave.

The expression "configured to" as used herein may be used interchangeably with "suitable for," "having the capacity to," "designed to," "adapted to," "made to," or "capable of" according to a context. The term "configured" does not necessarily mean "specifically designed to" in a hardware level. Instead, the expression "apparatus configured to . . . " may mean that the apparatus is "capable of . . . " along with other devices or parts in a certain context.

The expression "concurrently" or "concurrent" used herein in conjunction with the establishment of, or transmission over, communication channels, does not mean that a first and second communication channel is started, established, or transmitting at the same time, or ends or is terminated at the same time. Rather, a first communication channel is established or transmitting concurrently with a second communication channel when all or a portion of a first communication channel is established or transmitting at the same time as all or a portion of the second communication channel. Accordingly, a first communication channel is established or used concurrently with a second communication channel even when all or a portion of data transmission has been paused on one or both of the established channels.

Information and signals described herein may be represented using any of a variety of different technologies and techniques. For example, data, instructions, commands, information, messages, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the embodiments disclosed herein may be implemented on any number of data signals including a single data signal.

Various aspects of the embodiments described herein are referred to as having, or as being implemented by, a "unit", "device", "component", or "module". The labels given these items should not be used to limit the scope of the embodiments. These items and any other items used to implement the various functions, features, aspects, algorithms, methods, or processes of the embodiments described herein (collectively and severally "implementing structures") may be configured in a variety of ways without departing from the scope of the present invention. These implementing structures may include hardware, software, firmware or a combination of these. An implementing structure may denote a software or a hardware component such as a field programmable gate array (FPGA), an application specific integrated circuit (ASIC), or a programmable-logic device and may perform any role or function.

An "implementing structure" may be any structure configured to be in an addressable storage medium or to execute one or more processors. Accordingly, as an example, an implementing structure may include elements such as software elements, object-oriented software elements, class elements, and task elements, processes, functions, attributes, procedures, sub-routines, segments of program codes, drivers, firmware, micro-codes, circuits, data, database, data structures, tables, arrays, logic blocks and variables.

Functions provided in "implementing structures" may be combined as a smaller number of implementing structures or further divided into additional implementing structures. Implementing structures may be localized on one computer or distributed between two or more computers. In addition, implementing structures can execute from various computer-readable media having various data structures stored thereon. Implementing structures may communicate by way of local or remote processes, for example, as a signal with data packets between one module interacting with another module in a local device or system, distributed device or system, or across a network such as the Internet with other devices or systems.

Implementing structures may be configured to perform various operations described herein. Those skilled in the art will appreciate that, depending on implementation, such configuration can be accomplished through design, setup, interconnection, and/or programming of the particular implementing structure and that, again depending on implementation, a configured implementing structure might or might not be reconfigurable for a different operation.

One such implementing structure is a Multipoint Control Unit or "MCU." As used herein throughout, an MCU is any device that allows group media conferences between media conferencing endpoints, where the media includes at least video. Additionally, an MCU as used herein throughout is any device that can mix and re-encode group participants' media conferencing streams in real time. Further, an MCU as used herein throughout is any device configured to combine media streams from two or more endpoints into a single media stream accessible by all of the two or more endpoints. Still further, the term MCU includes any device that is capable of media transcoding to convert a media file from one format to another or make media data viewable across different platforms and devices. An MCU may include hardware, software, and/or firmware device and may consist of a controller, processors and/or memory. An MCU may include, or reside upon, any multisite media conference server. As used herein throughout, the term "media" includes at least video, audio (including voice) and alpha numeric data.

Some of the disclosed embodiments allow parties using a sign language translator to see each other over an additional communication channel, in addition to seeing and/or hearing the translator. Thus, there are references in this description to the MCU transmitting or providing "video data" or "video streams." There may also be references to the MCU providing "video" group conference rooms, conference calls or similar references to video. It will be appreciated, however, that the MCU is not limited to transmitting video data but may transmit other types of media data. Accordingly, the terms "video," "video data," "video group," "video groups," and other references to "video", as used in conjunction with an MCU, include all forms of media and the forgoing list of terms that include the word "video" should be considered the same as and interchangeably with "media, including at least video," "media data, including at least video data," "media group, including at least video group," "media groups, including at least video groups," respectively.

A "processor," as may be referenced herein throughout, may be any processor, controller, microcontroller, state machine or combination of the foregoing suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a general-purpose computer because, absent the disclosure, the general-purpose computer would not be able to carry out the processes of the disclosure.

A The methods or processes disclosed herein may be implemented in hardware, firmware, software, or a combination of these. Instructions for carrying out such process or method implementation may be stored or transmitted as one or more computer-readable instructions (e.g., software code) on a computer-readable medium. Computer-readable media includes both computer storage media and communication media including any transmission medium that facilitates transfer of a computer program from one place to another. A storage medium may be any available media that can be used to carry or store desired program code in the form of instructions or data structures and that can be accessed by a computer. By way of example, and not limitation, such computer-readable media may include RAM (e.g., SDRAM, DDR, RDRAM, SRAM, etc.), ROM, EEPROM, or CD-ROM. Computer-readable media may include compact discs (CD), laser discs, optical discs, digital versatile discs (DVD), floppy discs, Blu-ray discs or any disks or discs that reproduce data magnetically or optically. Computer-readable media may also include transmission media or signals such as electrical, electromagnetic, or digital signals, conveyed via a communication medium such as network and/or a wireless link.

Additionally, various connections may be termed a computer-readable medium. For example, if software is transmitted from a website, server, or other remote source using a coaxial cable, fiber optic cable, twisted pair, and digital subscriber line (DSL), wireless technologies such as infrared, radio, and microwave, and the like, then the preceding types of connections can be included in the definition of computer-readable media.

Computer-readable media may be packaged with a compatible device, such as the devices, components and/or units of the videophone described herein or may be provided separately from such devices. In addition, code, software, and/or program instructions may be encoded and transmitted via wired optical, and/or wireless networks conforming to a variety of protocols, including the Internet, thereby allowing distribution through many means including Internet download. Any such computer-readable medium may reside on or within a single computer product (e.g., a hard drive, a CD, or an entire computer system), and may be present on or within different computer products within a system or network.

Instructions for executing processes, methods, functions or operations associated with embodiments described herein may be stored in memory. The memory can store, transmit, and/or receive data or information related to the embodiments described herein, or components, modules or units of the embodiments described herein. "Memory," as referenced herein, can be either volatile memory or nonvolatile memory, or can include both volatile and nonvolatile memory. By way of illustration, and not limitation, nonvolatile memory may include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). References to "memory" are intended to comprise, without being limited to, these and any other suitable types of memory, and include computer storage media.

It will be appreciated that memory storing instructions executable by one or more processors may be in operable communication with the processor in any number of ways in the embodiments described herein. By way of non-limiting example, instructions for carrying a particular task within the system or component of the system may exist outside the system or component on an outside server or cloud server or device. A particular task may be performed by third-party software or application that needs to be accessed by the system or device. In one embodiment, a communication device may need to download a desktop app or mobile app in order to perform a task within the system. In other embodiments, instructions to perform a particular task in the system or components of the system may be provided through a software as a service (SaaS) arrangement. Thus references to memory in operable communication with a processor should not be limited to who wrote the instructions in the memory, where some or all of the memory is located, where some or all of the processors are located, or where some or all of the instructions are implemented.

In embodiments, described in this disclosure, implementing structures may include voice-capable networks and equipment, as well as video-capable networks and equipment. As used herein, voice-capable networks and voice-capable equipment means networks and equipment that can process, convey, reproduce, or a combination thereof, sounds in the auditory frequencies as analog signals, digital signals, or a combination thereof (hereinafter "voice data"). As non-limiting examples, such equipment includes conventional telephones, conventional cellular telephones, and conventional computers or handheld devices with microphone and speaker type capabilities. As non-limiting examples, such networks include a telephone network such as the Public Switched Telephone Network (PSTN) and other networks that are compatible and configured to provide communications using digital standards and data packets, an example of which includes Voice Over Internet Protocol (VOIP).

As used herein, video-capable networks and video-capable equipment means networks and equipment that can process, convey, reproduce, or a combination thereof, multi-frame images (hereinafter "video data"). As non-limiting examples, such equipment includes conventional cellular telephones with video capability, and conventional computers or handheld devices with camera and display type capabilities. As non-limiting examples, such networks include cellular networks, WiFi networks, wide area networks, hard wired networks and other private data networks configured to provide communications using digital standards and data packets. To facilitate the enhanced bandwidth needs of video phones, the video-capable networks may be implemented as a high bandwidth network such as a DSL, Cable, Ethernet, or other enhanced-bandwidth networking technology.

Users and user devices may be referred to in a variety of ways when describing the embodiments of the present disclosure. The systems, communication devices, methods, and computer products described herein may be particularly useful for deaf, hard-of-hearing and speech-impaired users. These users may be described as "audibly-impaired." User that are not audibly-impaired or may be referred to as "audibly-capable." In some embodiments described herein, users may be referred to as a "first user" and a "second user." In yet other embodiments, users may be referred as "near-end" users and "far-end" users. For convenience, devices used by audibly-impaired users are sometimes referred to as "near-end" devices or "first" communication devices. Similarly, the devices used by audibly-capable users might be referred to "far-end" devices or "second" communication devices. Similarly, data sent from, or originating at, the audibly-impaired, near-end or first user or device may be referred to as "near-end" data and data sent from, or originating at, the audibly-capable, far-end or second user or device may be referred to as "far-end" data. These terms are for convenience only for distinguishing between users and devices and are not meant to limit or define, a number, proximity, location, call initiator, call recipient, distance between, capability or importance of a user or device.

The disclosure provides meaningful limitations in one or more particular technical environments that go beyond an abstract idea. For example, embodiments of the disclosure provide improvements in the technical field of telecommunications, relay services for the audibly-impaired, and in particular developing new communication devices that include new features and functionality for the user devices as well as the relay service devices.

Referring now to FIG. 1, embodiments of a system 100 for video communication between parties are illustrated. In one embodiment, the system 100 includes a first communication device 102 associated with a first user 104 and a second communication device 106 associated with a second user 108. The system 100 may include a first communication channel 110 between the first user 104 and the second user 108. The first communication channel may be configured to transmit call data between the first communication device 102 and the second communication device 106. The system 100 may include a second communication channel 132 between the first user 104 and the second user 108. The communication channel 110 and the second communication channel 132 are configured to be established concurrently with each other. The second communication channel 132 is separate from the first communication channel 110. In one embodiment, the second communication channel establishing a direct connection (not shown) between the first communication device 102 and the second communication device 106. In another embodiment, the second communication channel 132 comprises an MCU. The second communication channel 132 may be configured to transmit media data between the first communication device and the second communication device.

In one embodiment, the first communication channel 110 include a relay system 114 that includes a call assistant station device 116 associated with a call assistant 118. In this embodiment, the system may be configured to establish and/or facilitate a communication session between an audibly-impaired user 104 and the audibly-capable user 108. In one embodiment, the system 100 establishes a communication session by establishing communication channels. The system 100 may establish the communication channels through the use of various types of equipment, which may be coupled together using one or more networks (not shown). In one embodiment, these networks may include video-capable networks and voice-capable networks as described above. As will be discussed in greater detail below, different types of data may be transmitted between different types of devices. However, it should be understood that the networks may be the same networks or different networks. The networks may include internet protocol (IP) networks. The networks may also include networks, such as, for example, public switched telephone networks (PSTNs). The networks may include a wide area network (WAN), a local area network (LAN), a personal area network (PAN), and combinations of any of these. The networks may include a cloud network. The networks may be configured to facilitate wireless communications, communications through cables, and combinations thereof. Some non-limiting examples of wireless communications (e.g., wireless electromagnetic signals) may include "WiFi," Bluetooth, Zigbee, near-field communication, and mobile wireless networks (e.g., cellular networks). Some non-limiting examples of suitable cables include fiber-optic cables, coaxial cables, traditional telephone cables, and Ethernet cables.

The first communication device 102 may be associated with an audibly-impaired user 104 and be configured for use with a VRS call. In one embodiment, the first communication device 102 may include one or more of a video phone device, a web camera configured for videoconferencing, a text-captioned device, keyboards, other devices or accessibility interfaces, and combinations thereof. The first communication device 102 may include a computing device configured to execute software directed to perform such communication capabilities. Examples of suitable computing devices may include a desktop computer, a laptop computer, a tablet computer, a personal digital assistant (PDA), a smartphone, and other computing devices. The first communication device 102 may include video-capable equipment suitable for transmitting and receiving video signals.

In one embodiment, the second communication device 106 may be associated with an audibly-capable user 108 and may include one or more of a telephone, a cellular phone, a smartphone, a video phone, a desktop computer, a laptop computer, a tablet computer, a personal digital assistant (PDA), and other communication devices. The second communication device 106 may include voice-capable equipment and may also include video-capable equipment. The first and second communication devices 102 and 106 are capable of capturing video data of their respective users 104 and 108, which the system 100 can transmit to both participants in the communication session. In one embodiment, the first and/or second user 104, 108 may use a different communication device (not shown) over each channel 110, 132. For example, a hearing-capable user, for example the second user 108, may user a standard telephone on communication channel 110 because the only connection on that channel may be the transmission of audio data between a hearing-capable user 108 and a hearing-capable call assistant 118. The user 108, my however choose to use a video phone to communicate and see the first user 104 over the second communication channel 132.

The system 100 is configured to establish the first communication channel 110 between the first user 104 and the second user 108. The first communication channel 110 may be configured to transmit call data 112, between the first communication device 102 and the second communication device 106. In one embodiment, call data 112, may include without limitation visual data, audio data and alpha-numeric data. Visual data may include any type of data captured by a camera or image signal processor. Visual data further includes video data as defined above. This data may be referred to collectively as "video data." Audio data may include any type of data captured by a microphone. Audio data also includes voice data as defined above and this data may be referred to collectively as "voice data." Alpha-numeric data may include any data input by a keyboard, which in one embodiment, may be a touch screen, and may be referred to as "text data".

The system 100 in one embodiment, may be configured to establish the second communication channel 132 between the first user 104 and the second user 108. The second communication channel 132 is established concurrently with the first communication channel 110. The second communication channel 132 includes an MCU 134 and is configured to transmit media data 124 between the first communication device 102 and the second communication device 106. The MCU 134 creates and additional endpoint in the second communication channel 132 effectively creating a first leg 136 of the first communication channel 132 between the first communication device 102 and the MCU 134. A second leg 138 of the second communication channel 132 is also effectively created between the second communication device 106 and the MCU 134. The MCU may create a single media stream, which in one embodiment includes video data, that is accessible by all the devices connected to it. It will be appreciated the MCU 134 may accommodate additional communication session participants. Thus, the second communication channel is configured to transmit media data between the first communication device, the second communication device, and one or more additional communication devices.

This concurrent communication channel embodiment may help facilitate a better experience for team media calls, where the first communication channel may be preserved in case there are problems with connecting to the group or team media conference over the second concurrent communication channel. It will be appreciated by those of skill in the art that the first communication need not include a relay system 114 or serve as a means for establishing a VRS-type call. The advantages and benefits of embodiments of the present invention can be realized by group or team calls established by two or more users over the first communication channel 110 followed by the concurrent establishment of the second communication channel for use between two or more users. In the case where the second communication channel includes an MCU. The second channel may be used by several users, including large teams or groups of hearing-capable users, hearing-impaired users, and combination thereof. It will be appreciated that in some embodiments, the participants of a non VCR-type group call may have associated user devices configured to display all or a portion of the participants of a group or team connected over the MCU of the second communication channel. In one embodiment, each user may also be able to view themselves.

In one embodiment, the first communication channel includes a relay system 114 for providing translation services during a communication session between the first user 104 and the second user 108. The relay system 114 includes a call assistant station device 116 associated with a call assistant 118. The relay system 114 may be employed to assist the audibly-impaired user 104 to communicate with users of voice-based communication systems. The relay system 114 allows and audibly-impaired user 104 to communicate with the call assistant 118, who is a sign-language translator, through sign language. The call assistant 118 conveys the translated sign-language to the audibly-capable user 108 through voice.

It will be appreciated that the existence of the relay system 114 establishes an additional endpoint along the first communication channel 110, effectively creating a first leg 120 of the first communication channel 110 and a second leg 122 of the first communication channel 110. The first leg 120 exists between the first communication device 102 (an endpoint) and the call assistant station device 116 (an endpoint) and the second leg 122 exists between the second communication device 106 (an endpoint) and the call assistant station device 116. It will be appreciated by those of skill in the art that more than one call assistant may work for a video relay system and that the video relay system may exist in one or more physical locations. Accordingly, reference to the call assistant station device is meant to include one or more devices that may be spread over one or more locations that have access to data from the first device 102 and second device 106.

In one embodiment, the call data 112 transmitted over the first communication channel 110, includes at least video data 124 between the first communication device 102 and the call assistant station device 116. In another embodiment, the first communication channel is configured to transmit call data 112 in the form of video data 124, voice data 126, and text data 128. The first communication channel 110 is also configured to transmit voice data 126 between the second communication device 106 and the call assistant station device 116.

In one embodiment, the first communication channel may include a relay system routing server 130 configured to facilitate the transmission of one or more of video data 124, voice data 126, and text data 128 between the first communication device 102 and the call assistant station device 116 and the transmission of voice data 126 between the second communication device 106 and the call assistant station device 116. In this embodiment, the first communication channel 110 may function as a Video Relay Service (VRS), functioning as described above.

In the embodiment where the first communication channel 110 includes the relay system 114, the MCU 134 may be configured to send and receive video data to and from the first communication device 102, the second communication device 106, and the call assistant station device 116. Accordingly, a single video data stream generated by the MCU is accessible to each of the first communication device 102, the second communication device 106, and the call assistant station device 116, establishing video data transmission between the first and second users 104 and 108. The connection between the MCU and the call assistant station device 116 creates an additional leg 140 there between. It will be appreciated by those of skill in the art that video streams can consume large amounts of bandwidth. The combined video stream created by the MCU and accessible to every participant in the media group over the second communication channel 134 obviates the need to create the second video transmission channel using the first communication channel, thus reducing bandwidth stress over the first communication channel 110.

The second communication channel 132 is separate from the first communication channel 110. The term "separate" as used with the communication channels 110 and 132, means that there is not a leg between any two endpoints 102, 106, 116, and 134 that is common to both the first and second communication channels 110 and 132. For example, there is no leg of the second communication channel 132 directly connecting the second communication device 106 with the call assistant station device 116 as there is in the first communication channel 110. Further, there is no leg of the second communication channel directly connecting the first communication device 102 with the call assistant station device 116 as there is in the first communication channel 110.

The communication channels 110 and 132 of the system 100 are configured to send and receive various types of data 124, 126 and 128 over various legs 120, 122, 136, 138 and 140 of the system during a communication session. However, it should be understood that data described as travel over particular legs is not exclusive of all other data. For example, other data may be transmitted over the various legs 120, 122, 136, 138 and 140 of the first and second communication channels 110 and 132. This data may include, without limitation, information, data, messages, signals and the like related to various data exchange or communication protocols or structures. For example, in one embodiment, the various legs 120, 136, 138 and 140 may be capable of transmitting session initiation protocol (SIP) data, transport protocol data, video conferencing protocol data, real time protocol data, voice over internet protocol and the like. As used herein throughout, "protocol data" includes data, signals or information of any kind that is not specifically called out as video, voice or text data.

The system 100 is further configured to use one or both of the first and second communication channels 110 and 132 to transmit video data 124 between the first communication device 102 and the call assistant station device 116. The system 100 may switch back and forth between the first and second communication channels 110 and 132 allowing the system to selectively transmit video data 124 between the first communication device 102 and the call assistant station device 116 over either or both of said first and second communication channels 110 and 132. In one embodiment, the system pauses the transmission of video data 124a over leg 120 and allows the second communication channel 132 to temporarily be the sole purveyor video data 124b sent between the first communication device 102 and the second communication device 108. The redundancy of communication channels 110 and 132 between the ultimate end points 102 and 106, with ability for the system 100 to selectively choose whether to send video data 124 over leg 120 and leg 136 provides several advantages.

One advantage of using two separate communication channels 110 and 132 is that it doesn't overburden the bandwidth of any one communication channel 110, 132. Another advantage is that with two separate concurrently connected channels servicing the same endpoints, namely the devices of the ultimate call participants, one channel can be used for administrative-type tasks, without adversely affecting the communication happening on the other channel. For example, there are times when the call assistant/interpreter needs a break or is not the right interpreter for the subject matter of a particular call, or for some other reason needs to hand the call off to another interpreter. Instead of ending the call or placing it on hold, while first interpreter secures a second interpreter and then transfers the call, thus disrupting the call, this may be done over the first channel 110. The communication happening on the second channel 132 is relatively unaware that the handoff even occurred until the new interpreter appears in the group video conference room.

Other advantage with the system is that if there is a problem with one or more of the parties connecting to the group video call on the MCU of the second communication channel 132, the call is not lost because it is still established on the first communication channel 110. Additionally, it allows the providers of VRS to be more compliant, or more efficient in their compliance, with FCC regulations. For example, providers of VRS are required by regulation, not to extend their translation services any more than is necessary to facilitate the conversion between the audibly-impaired user and the audibly-capable user. If both parties are fluent in sign language, interpretation services are not needed and calls can be ended quickly. Calls can be switch back and forth quickly between communication channels should one channel encounter technical difficulties. This can be done without a recall, which make the experience better for both call participants.

Furthermore, the system 100 can monitor the second communication channel 132 while preserving the call over the first channel 110, which may be a VRS call, to facilitate switching the video feed back for whatever reason. The reasons may include that that the audibly-impaired or audibly-capable user simply wish to terminate the video channel call after a time.

The system is configured such that a termination of transmission over the first communication channel 110 terminates transmission over the second communication channel 132. In another embodiment, the system 100 is configured such that a termination of transmission over the second communication channel 132 does not terminate the transmission over the first communication channel 110. The system 100 may be configured to terminate the communication session, some or all media data transmission over the first communication channel 110 and/or some or all media data transmission over the second communication channel 132. In one embodiment, various types of termination happen automatically, when certain predetermine conditions exist. In one non-limiting example, the detection of certain activity that violates certain FCC regulations may trigger automatic termination of the second communication channel 132 by the system 100. In other embodiments, system termination of the communication session or parts or all of transmission over the communication channels may be accomplished by the call assistant 118 selecting an option on their communication device 116.

Thus, the system 100 provides a more seamless and efficient way to allow call participants to view one another directly with less call system interruption. Video data 124 can be transmitted between parties to a call allowing both parties to see each other, including the nuances of body language and expression that cannot be conveyed through a sign language translator, while simultaneously benefitting from the sign language translation. It will be appreciated by those of skill in the art the second communication channel may also be configured to transmit media data between the first communication device, the second communication device, and one or more additional communication devices, when the first communication channel is essentially functioning as a VRS call.

Figure 2:
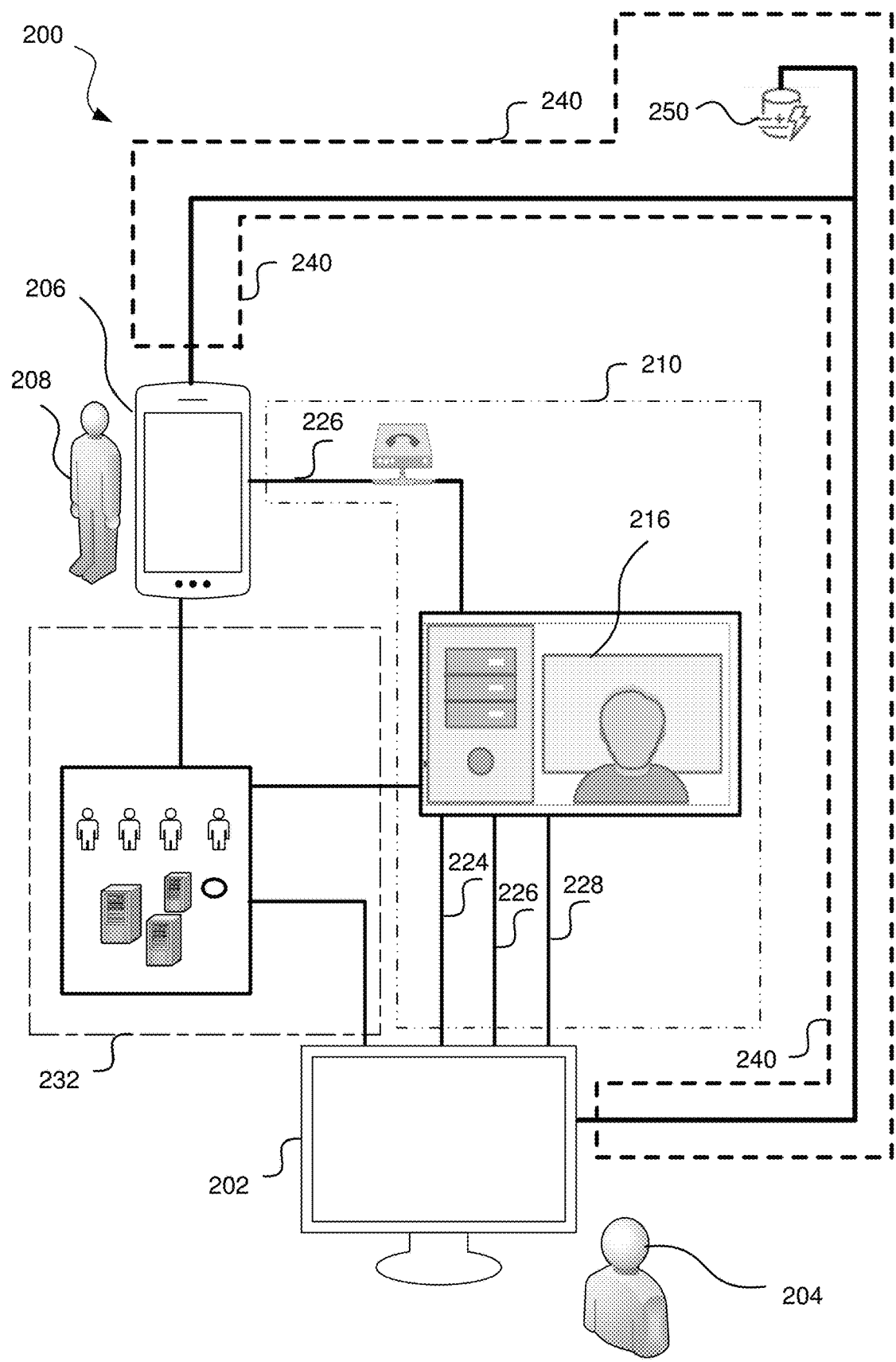
FIG. 2 is a simplified schematic diagram of a communication system configured to enable media communication between parties in accordance with one or more embodiments of the disclosure.

Turning now to FIG. 2, a schematic diagram of another embodiment of a system 200 is shown. This embodiment may include all the components and functionality of the system described in conjunction with FIG. 1. The system 200 may include a back channel 240 for communication between the device 202 of the first user 204 and the device 206 of the second user 208. This back channel 240 may provide a transmission channel for data, information, or between the users 204 and 208, that may not be video 224, voice 226, or text 228 data but that may be necessary or desired to better transmit video 224, voice 226 or text 228 data over the first and/or second channels (see FIG. 1).

The back channel 240 may allow the system 200 or devices 202, and 206 to access third party programs or applications, open source code, software as a service, and the like, which may be desirous or necessary for maximum utilization of the system 200. The back channel 240 may provide the system 100 or devices thereof 202 and 206 with access to data, information, signals, circuits, modules, coded instructions, applications, programs and other processes or structures to facilitate the transmission of data 224, 226, and 228 over the first and second communication channels (see FIG. 1). In addition, the back channel 240 may provide the system 200 or components thereof 202 and 206 with access to data or information from one or more databases 250, that may facilitate the use of the system 100 by a user 204, 208 to transferring video data 224, voice data 226, and/or text data 228 during a communication session.

In one embodiment, the back channel 240 provides the system 200 and system devices such as the first and second communication devices 202 and 206 with access to one or more application programming interfaces (APIs) through an API gateway. The back channel 240 may allow the system 200 and communication devices 202 and 206 to access serverless computing platforms or custom code, or services such as backend as a service (BaaS) or function as a service (FaaS) or cloud communications platform as a service (CPaaS). In other embodiments the back channel 240 allows the system 200 and components thereof 202, 206, and 2016 to access mobile and web application development platforms.

In one embodiment, the back channel 240 may provide the system 200 and its components 202 and 206 with a channel to accomplish administrative processes that might otherwise bog down the first and second communication channels (see FIG. 1). These processes might include user authentications, database management, remote updating, and push notifications, as well as cloud storage and hosting.

In one embodiment, the call assistant station device 216 may also have access to the back channel 240 for communication between the first communication device 202 and the second communication device 206 and for other purposes as described above.

Figure 3:
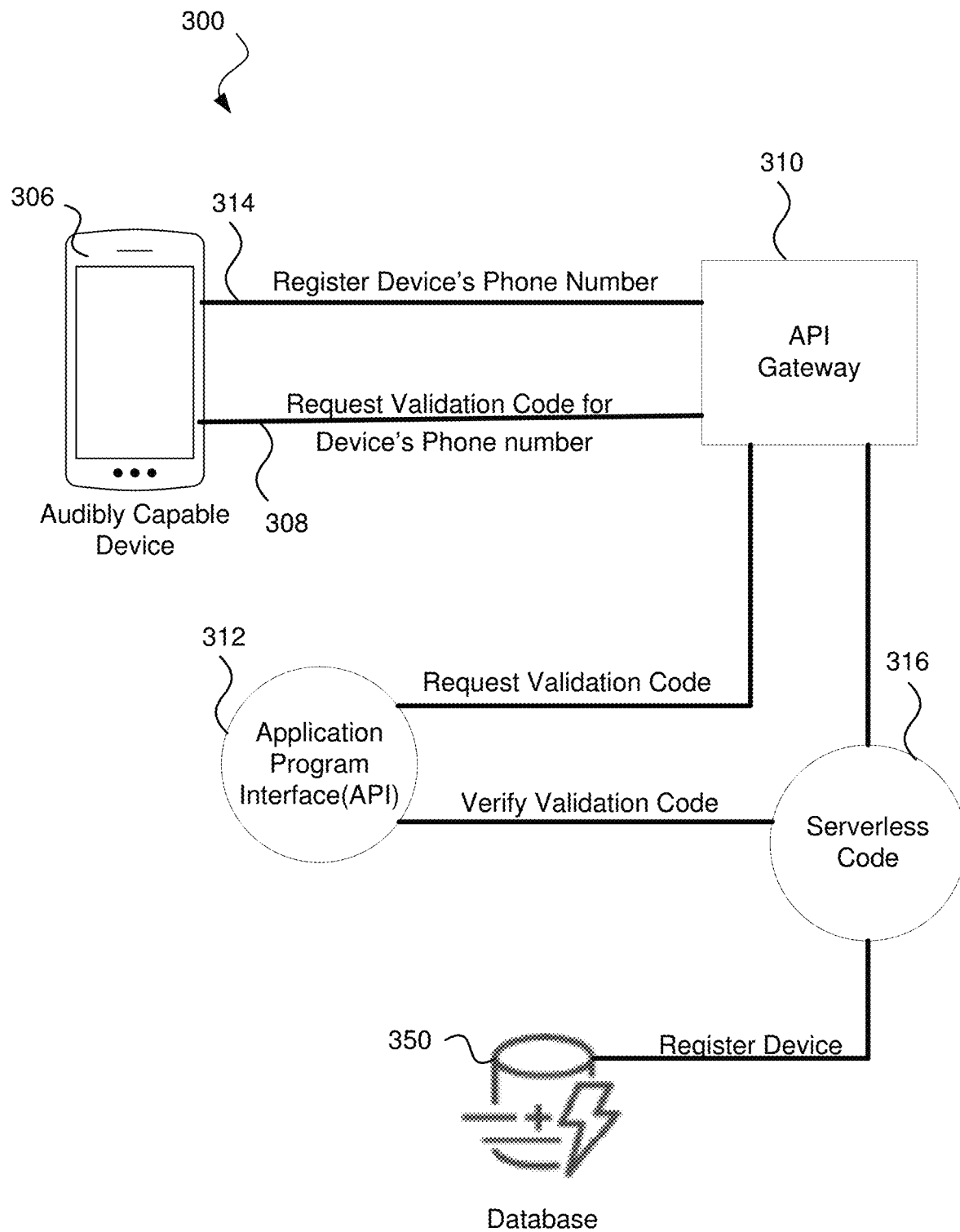
FIG. 3 is a simplified schematic block diagram of process for registering a device for use with a communication system in accordance with one or more embodiments of the disclosure.

Turning now to FIG. 3, a schematic block diagram of a process 300 that might be accomplished through a back channel of a system such as the systems described in conjunction with FIGS. 1 and 2 is shown. In this embodiment, the second communication device 306, associated with an audibly-capable user (not shown) may request a validation code for its phone number by sending a signal 308 over the back channel. In one embodiment, the signal 308 is sent to an API gateway 310 to an API 312 used for providing validation codes. Once the second communication device receives the validation code, it may use the code to register its phone number identifying the phone as one configured to work with the second communication channel, as discussed in conjunction with FIG. 1. This process may include sending a signal 314 through the API Gateway 310 to serverless code 316 which may verify the validation code and store the registered device 306 information in a data base 350.

Figure 4:
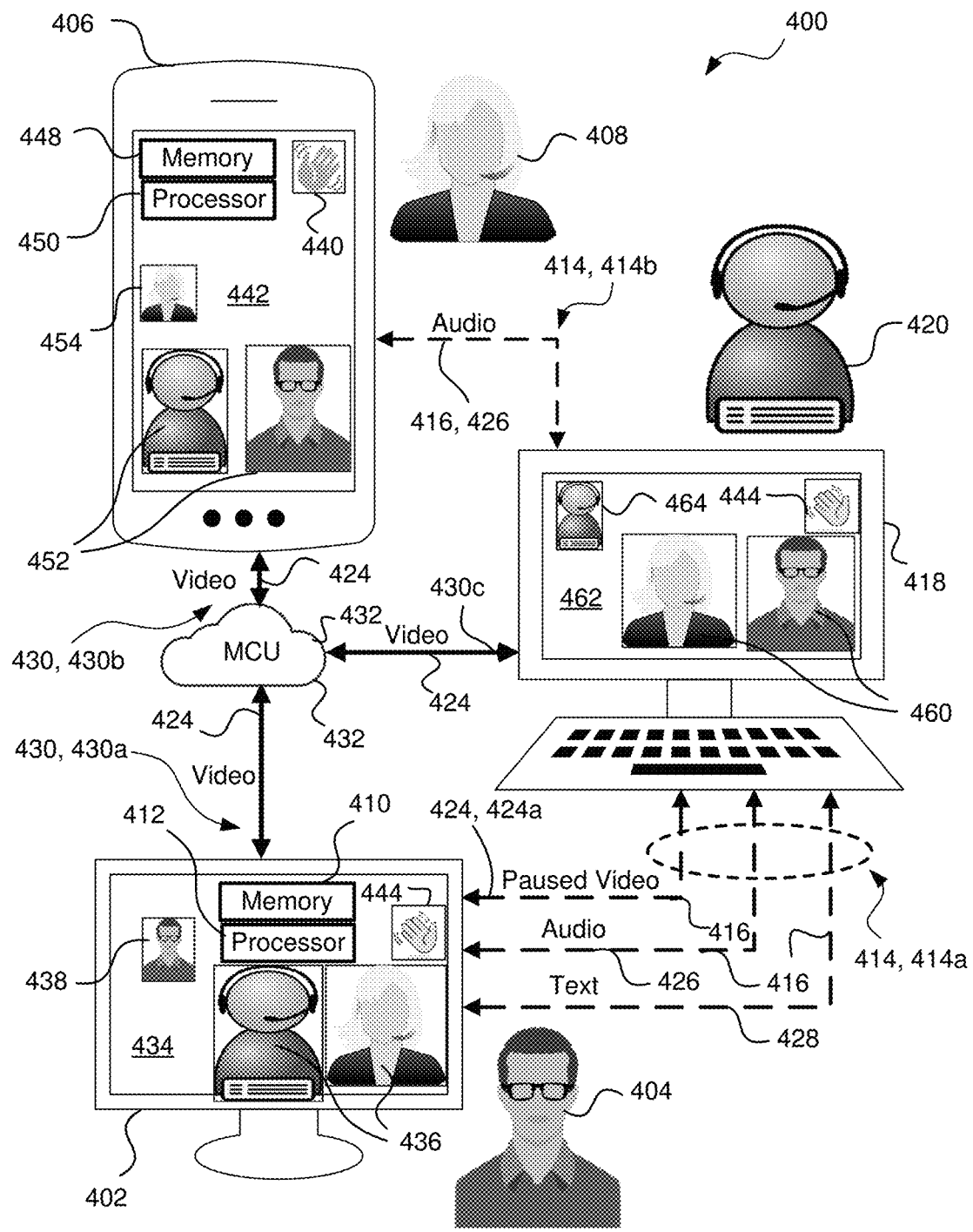
FIG. 4 is a simplified schematic diagram of a communication system configured to enable media communication between parties showing device user interfaces in accordance with one or more embodiments of the disclosure.

Turning now to FIG. 4, a schematic block diagram is shown of a multiple users using communication devices to access a system 400 of communication. The system 400 may be of a type described in conjunction with FIGS. 1 and 2.

In one embodiment, a first communication device 402 is configured to facilitate a communication session between a first user 404 using the first communication device 402 and a second user 408 using a second communication device 406. The communication device 402 includes a memory 410 configured to store instructions. The communication device 402 also includes a processor 412 that is operatively coupled with the memory 410. The processor 412 is configured to execute the instructions to perform certain operations including requesting a communication session between the first communication device 402 and the second communication device 406. The operations performed by the processor also include establishing a first communication channel 414 configured to transmit call data 416 between the first communication device 402 and the second communication device 406. In one embodiment, the call data 416 may be one or more of video data 424, voice data 426, text data 428 and protocol data (not shown). The first communication device 402 and the second communication device 406, may be of a type disclosed herein throughout the description of embodiments.

The first communication device 402 in one embodiment, may be configured to establish a second communication channel 430 between the first user 404 and the second user 408. The second communication channel 430 is established concurrently with the first communication channel 414. The second communication channel 430 includes an MCU 432 and is configured to transmit video data 424 between the first communication device 402 and the second communication device 406. The MCU 432 creates and additional endpoint in the second communication channel 430 effectively creating a first leg 430a of the second communication channel 430 between the first communication device 402 and the MCU 432. A second leg 430b of the second communication channel 430 is also effectively created between the second communication device 406 and the MCU 432.

In an embodiment where the first communication channel 414 includes a relay system (not shown but see for example FIG. 1) for providing translation services during a communication session between the first user 404 and the second user 408, the relay system would include a call assistant station device 418 associated with a call assistant 420 who acts as an interpreter. The first communication channel 414 may be configured to transmit at least video data 424 between the first communication device 402 and the call assistant station device 418. In another embodiment, first communication channel 414 is configured to transmit video data 424, voice data 426, and text data 428 between the first communication device 402 and the call assistant station device 418. This allows the call assistant 418 to view the first user 404 through video data 424 captured by the first communication device 402 and sent over the video data portion 424 of the first leg 414a of the first communication channel 414. The call assistant 420 translates sign language used by the first user 402 into spoken voice, and the corresponding voice data 426, would be transmitted over the second leg 414b of the first communication channel 414b. A relay system router or routing server (not shown), may facilitate the transfer of data through the relay system over the first communication channel 414. The first communication device 401 is configured to utilize these communication channels 414 and 430 and is configured to send and receive data as described herein.

The second communication channel 430 includes an MCU 432. The second communication channel 430 is separate from the first communication channel 414 and is configured to transmit video data 424 between the first communication device 402 and the second communication device 406 so that the call participants 404 and 408 can see each other even though there is sign language translation occurring between the parties through the relay system on the first communication channel 414. The MCU 432 also allows the call assistant 420 to call into the group video conference facilitated by the MCU 432 over leg 430c of the second communication channel 430. It will be appreciated by those of skill in the art that multiple call assistants may call into and connect to the MCU. Accordingly, even in the system 100 configuration where the first communication channel 110 serves a VCR-type call, there may be more participants that just the first user 104, the second user 108 and the call assistant 118. There may be multiple hearing-impaired and/or hearing-capable users on the call. These additional users, in one embodiment, are invited to join the call and can accept the invite in ways described herein throughout.

The first communication device 402 in one embodiment includes instructions in memory 410, that when executed on the processor 412 allows the first communication device 402 to receive video data 424 from the second communication device 406 and from the call assistant station device 418. In one embodiment, this happens as part of the establishment of the second communication channel 430. The first communication device 402 may be configured to receive the video data 424 from the second communication device 406 over first leg 430a and second leg 430b of the second communication channel 430 and video data 424 from the call assistant 420 over leg 430c. In operation, the particular configuration of the second communication channel allows each of the first user 404, the second user 408, and the call assistant 420 to send and receive video data 424 from the others, or in other words, everyone can see each other, by each connecting to the MCU 432.

In one embodiment, the first communication device 402 is configured with a display 434 and instructions stored in memory 410 that when performed by the processor 412 carry out operations to display video data 424 from the second communication device 406 and video data 424 from the call assistant station device 418 simultaneously on the display 434 of the first communication device 402. Thus, the first user 404 can see the "live action" 436 of both the second user 408 and the call assistant 420 at the same time. In another embodiment, the first communication device is configured to also allow the user 404 to see "live action" 438 of the themselves on the display 434 simultaneously with the others 408, 420. The first communication device 402 may also be configured to display less than all or none of the other participants or media data sent by one or more of the other participants.

Accordingly, the first communication device 402 and communication channels 414 and 430 are configured to allow the call assistant 420 to see the first user 404 signing, which sign language is converted by the call assistant 420 and voiced to the second user 408 over the audio leg 414b of the first communication channel 414. The first communication device 402 and channels 414 and 430 are further configured to allow the second user 408 to see the first user 404. And although the second user 408 may not understand what the signing of the first user 404 means without hearing the interpretation of it by the call assistant 420, the second user 408 can see the expression and body language of the first user 404 over the first channel 430, while hearing, over the first communication channel 414 what the first user 404 is signing. Similarly, the first user 404 or audibly-impaired user 404, who may not be able to understand what the second user 408 is saying without the sign language translation provided by the call assistant 420 at the relay system, can nonetheless see the expression and emotion of what is being said over the second communication channel.

Additionally, the processor 412 of first communication device 402 may include instructions stored in the memory 410 to allow the first communication device 402 to receive video data 424 from the call assistant station device 420 over one or more of the first communication channel 414 and the second communication channel 430. This selectivity is facilitated by the concurrent transmission of the video data 424 over the video portion of leg 414*a* of the first channel 414 and leg 430*c* of the second communication channel 430.

Additionally, the system 400 is configured to selectively pause the video data 424 transmission over one of these legs 414*a*, 430*c* while selectively continue to transmit video data 424 over the other leg 414, 430*c*. This configuration gives the system 400 freedom, selectivity, and control to switch the video feed back and forth over these legs 414*a*, 430*c*. Because the transmission of video data 424 between the call assistant station device 418 and the first communication device 402 is vital for the sign language translation portion of a VRS provided by the relay system, the freedom, selectivity, and control provided by call system 400 embodiments disclosed herein, allow for fewer disconnects, call restarts, and disruptions, as well as a better overall communication session experience.

The system 400 and other systems described herein may include more than just the devices 402 and 406 shown in FIG. 4. Where the first communication channel 414 serves as a VRS-type call vehicle, the call assistant 420 has a communication device 418. In one embodiment, each of these devices may be configured to selectively display zero or all participants in a communication session. In embodiments where the first communication channel does not include a relay system, and the concurrent use of communication channels 414 and 430 are used more to facilitate a less disruptive group or team communication session. The devices of the communication session participants, or in other words the team, may each have the capability to selectively display all or some or none of the participants of the communication session.

The first communication device is configured with instructions in memory 410 executable by the processor to send an electronic invite to the second communication device 406 to connect with first communication device 402 over the second communication channel 430. These operations may be carried out as part of the establishment of the second communication channel 430. Operationally, the connection between the first communication device 402 and the second communication device 406 may happen when both the first and second communication devices 402 and 406 connect to the MCU 432. As will be discussed in greater detail below, the invitation may occur over a back channel of the kind described herein (see FIG. 2). The invitation may cause an icon 440 to appear on a display. In one embodiment, the selection of the icon by the second user 408 on the second communication device 406, may trigger a signal that passed through the back channel to the first device 402 requiring a confirmation of the invitation acceptance. This signal may cause an icon 444 to appear on the display 434 of the first communication device 402, that when selected, confirms the acceptance of the invention. The functionality of this configuration may be desirable, given existing or future FCC regulations.

The first communication device 402 may be configured to determine whether the second communication device 406 is configured for communication over the second communication channel 430. This may also be done as part of the establishment of the second communication channel 430. As will be discussed in greater detail below, invitation and configuration verification may occur as part of the establishment of the second communication channel 430. As will be discussed in greater detail below, the configuration determination may also occur over a back channel of the kind described herein (see FIG. 2).

The first communication device 402 may also be configured with instructions in memory 410, such that when carried out by the processor 412, the communication session or the first or second communication channels 414 and 430 terminate. In one embodiment, the first communication device 402 may be configured to terminate the communication session or certain types of media transmission over either the first 414 or second 430 communication channels. It will be appreciated that the second communication device 406 may be configured with the same or similar instructions stored in its memory 448 to be carried out by its processor 450.

The first communication device 402 is configured with the units, devices, components, modules, hardware, firmware, software, and/or other implementing structures necessary to perform the processes and functionality described herein throughout with regard to the first communication device 402. It will be appreciated that certain processes and functions, including the carrying out of certain instructions stored in memory (which memory may reside in multiple locations as defined above), may be carried out through one or more computer or mobile applications. In one embodiment, these may need to be downloaded in advance.

A second communication device 406 may be configured to facilitate a communication session between a second user 408 using the second communication device and a first user 404 using the first communication device 402. The second communication device may include memory 448 configured to store instructions. The communication device 406 also includes a processor 450 that is operatively coupled with the memory 448. In one embodiment, the processor 450 may be configured to execute instructions stored in memory 448 to perform operations that are the same or similar to those in which the first communication device 402 is configured to carry out. The second communication device 406 is configured to carry out operations including: requesting a communication session between the first communication device 402 and the second communication device 406; establishing a first communication channel 414 configured to transmit call data 416 between the first communication device 402 and the second communication device 406; establishing a second communication channel 430 concurrently with the first communication channel 414; and terminating the communication session, as discussed in conjunction with the description of the first communication device 402 and with the system functionality described herein throughout.

The second communication device 406, in one embodiment includes instructions in memory 448, that when executed on the processor 450 allows the second communication device 406 to receive video data 424 from the first communication device 402 and from the call assistant station device 418. In one embodiment, this happens as part of the establishment of the second communication channel 430. The second communication device 406 may be configured to receive the video data 424 from the first communication device 402 over the first leg 430a and the second leg 430b of the second communication channel 430 and video data 424 from the call assistant 420 over leg 430c. The configuration of the second communication channel allows each of the first user 404, the second user 408, and the call assistant 420 to send and receive video data 424 from the others, or in other words, everyone can see each other, by each connecting to the MCU 432.

The second communication device 406 is configured with a display 442 and instructions stored in memory 448 that when performed by the processor 450 carry out operations to display video data 424 from the first communication device 402 and video data 424 from the call assistant station device 418 simultaneously on the display 442 of the second communication device 406. Thus, the second user 408 can see the "live action" 452 of both the first user 404 and the call assistant 420 at the same time. In another embodiment, the second communication device is configured to also allow the second user 408 to see "live action" 454 of the themself on the display 442 simultaneously with the others 404 and 420. The second communication device 406 may also be configured to display less than all or none of the other participants or media data sent by one or more of the other participants.

The second communication device 406 is configured with instructions in memory 448 executable by the processor 450 to receive electronic invite from the first communication device 402 to connect with the first communication device 402 over the second communication channel 430. These operations may be carried out as part of the establishment of the second communication channel 430 by the second communication device 406. The second communication device 406 may be configured with operational instructions to send the first communication device 402 a confirmation of invite receipt and/or acceptance. The acceptance and/or acknowledgement of the invitation may also be done as part of the establishment of the second communication channel 430 by the second communication device 406.

The second communication device may be configured with operational instructions to facilitate registering the second communication device for use on the second communication channel 430.

The second communication device 406 is configured with the units, devices, components, modules, hardware, firmware, software, and/or other implementing structures necessary to perform the processes and functionality described herein throughout with regard to the second communication device 406. It will be appreciated that certain processes and functions, including the carrying out of certain instructions stored in memory (which memory may reside in multiple locations as defined above), may be carried out through one or more computer or mobile applications. In one embodiment, these may need to be downloaded in advance.

As described above in conjunction with the description of the first communication device 402 the second communication device 406 may be configured to connect with and engage with communication systems of the kind described herein throughout.

It will be appreciated that the first communication device 402, second communication device 406, and/or system 400 may be configured to establish a second communication channel 430 concurrently with the first communication channel 414. In one embodiment, the process of establishing a second communication channel 430 may occur automatically after the establishment of the first communication channel 414. In other embodiment, the process of establishing the first and second communication channels may occur automatically upon the request of the communication session. In other embodiments, the request may cause a signal to indicate that the establishment of the first communication channel 414 may begin. The establishment of the second communication channel 430 may depend upon signals delivered by the communication device and/or the system 400. It will be appreciated that the first and second communication devices 402 and 406 may be configured in a variety of ways to interact with, or within, the communication systems described herein throughout to use the functionality of those systems.

With reference still to FIG. 4, system 400 may be configured to display "live action" video data 460 from the first communication device 402 and second communication device 406 and a display 462 of the call assistant station device 418 simultaneously. Additionally, in one embodiment the system 400 is configured to display "live action" video data 464 of the call assistant 420 on the display 462. Accordingly, in one embodiment, the system 400 can display all of the participants 404, 408, and 420 all of the participants displays 434, 442, and 462 simultaneously. The display 418 may also be configured to selectively display less than all or none of the other participants or media sent by other participants.

Figure 5:
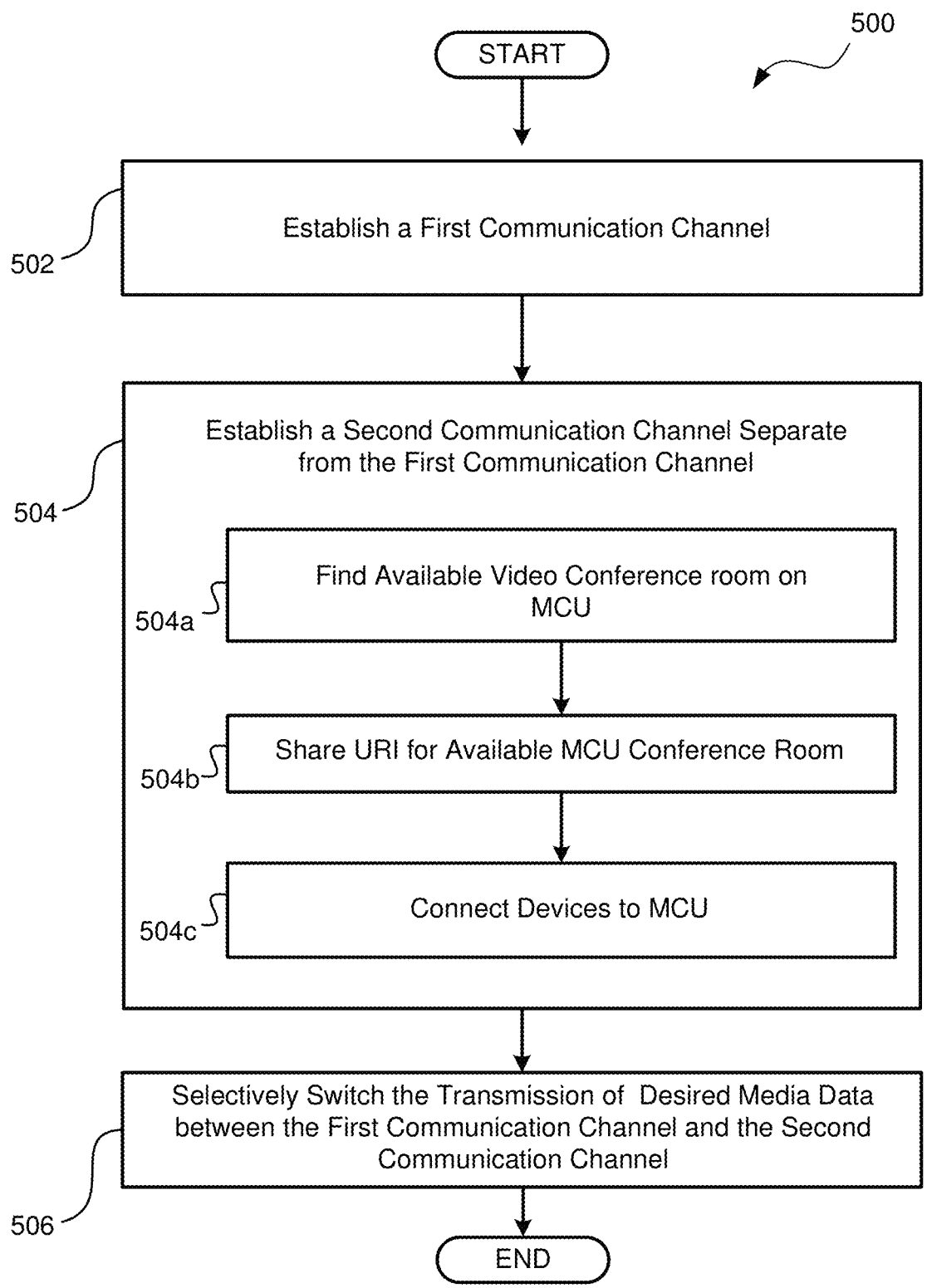
FIG. 5 is a schematic block diagram of a method for communication between parties in accordance with one or more embodiments of the disclosure.

Turning now to FIG. 5, a block diagram of a method 500 of communication between parties is shown. The method 500 may include the step 502 of establishing a first communication channel between a first communication device associated with a first user and a second communication device associated with a second user. The first and second communication devices may be of a type described herein. The functionality, operability, and configuration of the first communication channel may be as described herein throughout. The step 502 may include determining whether a communication session is desired, which may be accomplished by the system or components thereof fielding or identifying an initial call by either of the parties or by receiving notice from one or more the parties that such a communication session is desired.

The method 500 may include the step 504 of establishing a second communication channel between the first communication device and the second communication device. In one embodiment the second communication channel is established concurrently with the first communication channel. The functionality, operability and configuration of the second communication channel, and its separateness from the first communication channel, may be as described herein throughout. The step 504 of establishing a second communication channel may include determining whether the second communication device is configured for communication over the second communication channel.

The step 504 of establishing the second communication channel may include the step 504a of finding an available group video conference room on an MCU. Step 504 may further include the step 504b of sharing the uniform resource identifier (URI) of the available MCU conference room with at least the first communication device and the second communication device. The step 504 may also include the step 504c of connecting these devices to the MCU. In one embodiment the step of connecting all devices to the MCU does not occur until after a verification that the second communication device is properly configured for access to the second communication channel.

The method 500 may include the step 506 of selectively switching the transmission of desired media data between the first communication channel and the second communication channel. This step 506 may include a step of pausing transmission of one or more types of media data over one or both of the communication channels. In one embodiment, video data transmission over the first communication channel may be paused, while video data is transmitted over the second communication channel. In another embodiment, media may be sent over both channels. It is to be understood that switching the transmission of video data between the first and second communication channels includes switching back and forth between the communication channels.

The step 506 of selectively switching the transmission of desired media between the first communication channel and the second communication channel may include making at least one determination such as determining whether one of more of the first and second communication devices desires to stop sending and/or receiving media data over one or more of the first and second communication channels. Selectively switching 506 the transmission of desired media between the communication channels may include determining whether one of more of the first and second communication devices is unable to transmit call data over one or more of the first and second communication channels. Selectively switching 506 the transmission of desired media between the communication channels may include determining whether one or more of the first and second communication channels is unable to transmit media data. Selectively switching 506 the transmission of desired media between the communication channels may also include determining whether transmission of media data over the first or second communication channels is in violation of an FCC regulation.

In one embodiment, selectively switching 506 the transmission of desired media between the communication channels may done automatically in response to one or more of the determinations described above, or other determinations. In another embodiment, the option to switch the transmission of desired media between the first communication channel and the second communication channel may be presented to one or more of the communication session participants on their communication devices for selection.

The method 500 may also include the step of terminating the communication session and/or transmission of some or all of the media data over the individual communication channels thereof. The termination step may include terminating the second communication channel upon termination of the first communication channel. The second channel may be terminated and the media data transmitting over that channel may be switched back to transmission over the first channel and vice versa. The step of terminating the communication session and/or transmission of some or all of the media data over individual communication channels may be done automatically in response to one or more of the determinations described above, by choice of one or more communication session participants or by other determinations. In another embodiment, the option to terminate the communication session and/or transmission of some or all of the media data over individual communication channels may be presented to one or more of the communication session participants on their communication devices for selection.

In one embodiment, the first communication channel may include a relay system for translation between the first and second users. The relay system may include a call assistant and a call assistant station device. In this embodiment, the first communication channel may be configured to transmit at least video data between the first communication device and the call assistant station device and voice data between second communication device and the call assistant station device. Establishing a second communication channel in this configuration may include sharing a URI of an available group media conferencing site on an MCU with the call assistant station device and connecting the call assistant station device to the MCU. In one embodiment, the option to switch the transmission of desired media between the first communication channel and the second communication channel may be presented to the call assistant on the call assistant station device for selection. The option to terminate the communication session and/or transmission of some or all of the media data over individual communication channels may also be presented to the call assistant on their communication device for selection.

Figure 6:
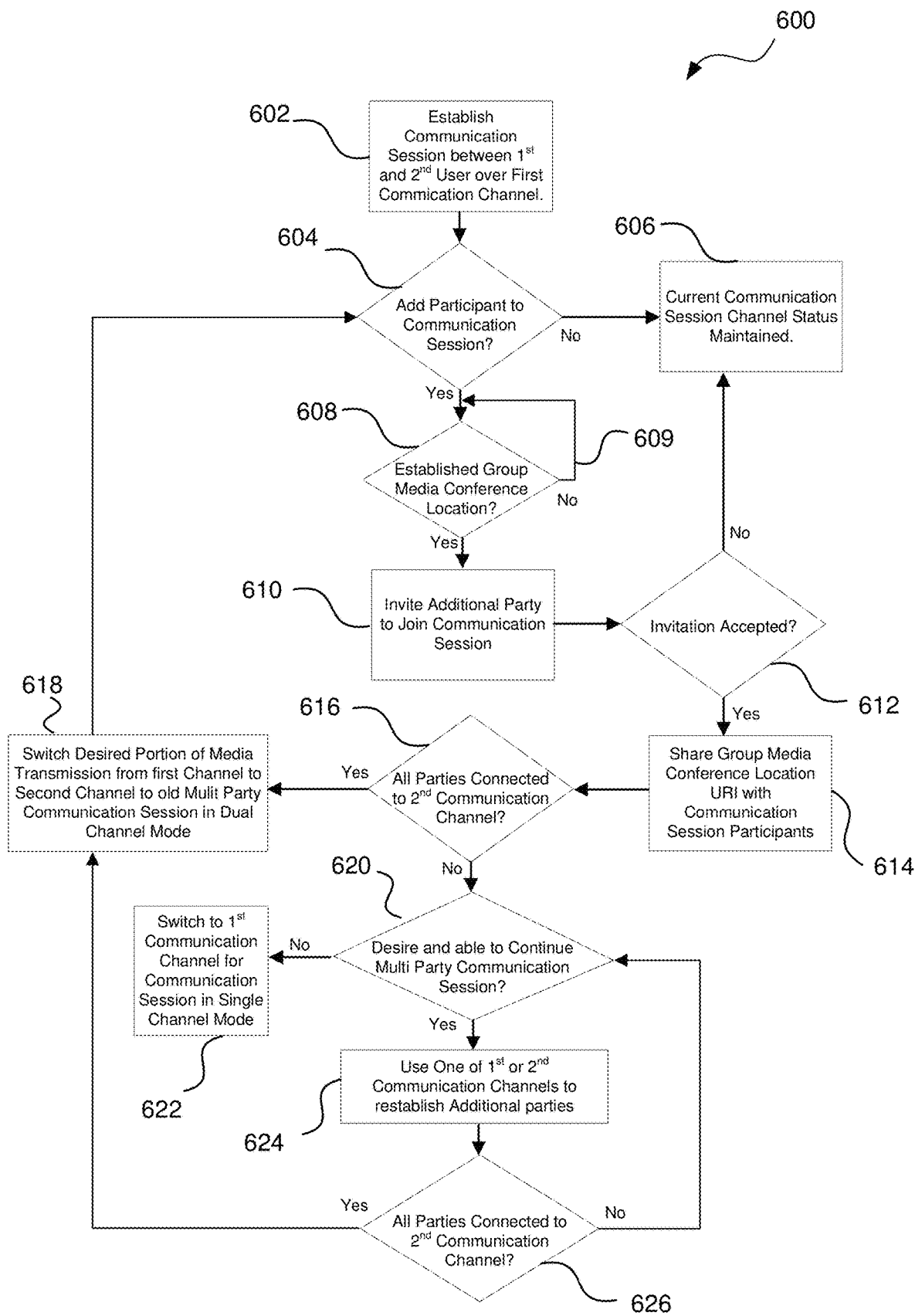
FIG. 6 is a schematic block diagram of a system workflow in accordance with one or more embodiments of the disclosure.

Referring now to FIG. 6, a flow chart 600 for communication by one embodiment of a system, such as described herein, and/or one or more communication devices, such as described herein. Accordingly, the steps as described in this embodiment, may be performed either directly or indirectly by the system, or components thereof, including without limitation, the communication session participants' communication devices.

The flow 600 may begin with the establishment 602 of a communication session between a first user and a second user over a first communication channel. The establishment of the first communication channel may accomplished by the first user calling or attempting to communicate with the second user, and the second user receiving the call or communication attempt to establish a connection over one or more of a video-capable network, a voice-capable network, and/or other suitable network for establishing communication. It will be appreciated that some or all of these networks may be the same network. In one embodiment, the establishment of the communication session between a first user and a second user over a first communication channel may be accomplished by the system receiving notification that a request for communication between a first and second user has been made, received, and/or that the users' devices have connected.

The flow 600 may continue by determining 604 whether to add an additional user or participant. If the answer is no, the current communication session channel status is maintained 606. In one embodiment, the communication channel status may be communication or transmission of one or more types of media data over a single channel in what may be called a "single channel mode" over one of the communication channels or communication. The status may also be transmission of one or more types of media data over a one or more channels with both channels established in what may be called "dual channel mode." At this point in the flow description, only one communication channel has been established.

If at step 604, the answer to the query is yes, then the flow 600 continues by determining 608 whether a group media conference location is established. The determination to add a participant to the established communication session over the first communication channel may be made selecting an option to add a party on one or more of the communication devices participating in the communication session.

The determination may be made by simply determining that a location with corresponding URI has already been established. If it hasn't been, the flow may include the step of finding an available group media conference location on an MCU and determining the URI for the location. In one embodiment, finding an available group media conference location on an MCU and determining the URI for the location is accomplished by sending out a request. The request may be an HTTPS request, a SIP request, a request by other types of protocol data or other requests known in the art to establish a group media conference room. The request may initially be to a group media conference service, which may assist in the search by reaching or signaling out to multiple MCUs or MCU servers to check for space to allocate to a group media conference room on the MCU. It will be appreciated by those of skill in the art that the search servers and the MCU may be cloud-based or reside on LAN, WAN or other suitable server or network of servers established for MCU use. In one embodiment, the server space request is made by the communication device establishing the first communication channel in the first communication session. It will be appreciated that the other communication device may also make the request. In one embodiment, the system, either directly or indirectly through its components, may make the request and find space on the MCU.

If space for a group media conference room on an MCU is not already established, or if initial attempts to locate space for a group media conference room are unsuccessful, the search may continue 609 until such time as space is found and allocated and a URI for the location is returned.

If the group media conference location already exists, or space is found for the group media conference over an MCU, a URI for the group video conference room location is provided to all communication session participants not connected to the MCU. The URI allows participants to dial in to the MCU. It will be appreciated that the MCU can take the media stream, including video data, from a variety of source hardware over a variety of network connection and combine the media streams into a single media stream accessible by all communication participants through the MCU. It will further be appreciated that the URI may be provided to all communication participants by means of the first communication channel, a back channel such as described in conjunction with FIGS. 2 and 3, by protocol data, or by other means known in the art. In one embodiment the URI may be shared as part of a computer or mobile App residing on one or more of the communication devices participating in the communication session. The URI may be shared by any number of implementing structures, such as hardware, software, and/or firmware residing locally on the communication devices or system, or remotely across one or more storage mediums and/or servers.

If there is an established group media conference room on an MCU, the additional participant to the communication session is invited 610. This invitation may also be part of a computer or mobile APP or other implementing structures of a kind described herein throughout. In one embodiment, the additional participant's device is sent the invitation to join the communication session as part of a push token. If the invitation is rejected, the current communication session channel status is maintained. At this point in the description of this flow chart 600, there would be only two participants in the communication session and the communication session would only be established over a single communication channel. If the invited participant accepts the invitation, then all participants are provided with the URI to connect to the MCU 614. In one embodiment, one or more of the original communication session may connect to the MCU using the MRI prior to the invitation to the additional participant. This may be desirable to confirm the connectability of the participants to the MCU. Should these attempts fail, the original communication channel is still established and the communication session is not lost. The process of finding an MCU and connecting to it by the original participants may be repeated until connection to the MCU by the original participants is established. At this point, in one embodiment, the invitation to an additional party to join the group media conference over the MCU may be sent.

In one embodiment, the ability to use the dual channel communication system, apparatuses, and/or methods of the present invention may be by way of registration. The Apps, computers, software or other implementing devices used to establish the communication sessions described herein may require that participating communication devices by preregistered. In one embodiment, such registration informing may include the devices telephone number, web address, or other information that may be used to connect with the registered device. In this embodiment, the step of inviting additional parties to join the communication session by calling into and connected to the group media conference facilitated by the MCU may include checking a database of registered devices to validate that device is registered, or in other words configured for using the system and the communication channels set up by the system directly, or indirectly though one or more communication devices. Confirmation of registration may automatically trigger the invite to the participant desired to be added. The invitation in one embodiment, includes the URI of the MCU group media conference room.

In another embodiment, a computer or mobile App, software, or other implementation structure may trigger an "invite" icon to appear on one or more of the communication devices of the original communication participants. Selecting the icon may be the way a communication session participants determines that an additional participant should be added. In one embodiment, the selection of the icon trigger the establishment of a group media conference location on the MCU and may further trigger the sending of the invitation and URI to the party to be added. Selecting the icon may further trigger determining whether the party to be added has a registered device, in embodiments where that is necessary. See FIG. 4.

In one embodiment, the sending of an invitation 610 by push notification or otherwise triggers an icon to appear on the invited participant's communication device. Selection of the icon by the invited participant signals acceptance of the invitation and in one embodiment, the added participant's communication device automatically uses the URI passed along with the invitation to call in and connect to the MCU group media conference room.

When the URI is shared with all participants who are not connected to the MCU group media conference room, the flow 600 moves to determining whether all participants have connected to the MCU group media conference room. This may be accomplished as a function of the MCU determining that there is a change in the connections to the MCU. This information may be passed to one or more participants to the communication session. Connection to the MCU by the participants establishes the shared common media stream created by the MCU as a secondary or second communication channel. If all the communication participants, including the newly added participant, are connect to the MCU establishing the second communication channel, a portion of the media data shared between participants on the first communication channel ay be shared over the second communication channel. For example, it may be desirous to view video data over the MCU to conserve bandwidth, reduce coding time and issues, or other reasons. In this example, transmission of the video portion of the original communication session over the first communication channel may be switched 618 to the second communication channel. The video data transmission over the first communication channel may be paused for so long as desired or for so long as the video data transmission is being handled by the second communication channel.

When transmission of media data over the second communication channel established by the MCU is no longer desired, necessary, or possible, transmission of such media data may be switch back to the first communication channel. While the video data is being transmitted by the second communication channel, other media data, such as for example, audio or alphanumeric data may still be transmitting over the first communication channel. It will be appreciated that the dual channels allow for the advantages and benefits of the present invention as described herein.

If all the parties are not able to connect to the second communication channel, a query 620 may be made to determine whether to continue with the multi-party communication session or if it is still possible to have a dual communication channel call due to technical difficulties, lack of parties desiring to be on the dual communication channel call, possible improper use, and the like. If the answer is no, a switch may be made back to the original single communication channel mode of the communication session. If the answer to query 620 is yes, a reconnection may be established over one of the two existing communication channels. This may appear to occur in the background to the participants still communicating over the second communication channel. The reestablished connection to a participant's device may simply rejoin the portion of the communication session occurring over the second communication channel. Thus, the dual channel configuration of the present invention allows for less disruption to communication session participants and enhances the experience.

It will be appreciated that during a multi-party communication session, it may be desirous to add yet another participant. If this is the case, the flow 600 transfers back to decision 604 and continues from there as additional participants are added to the communication session. In one embodiment, these additional participants may be added simultaneously or substantially simultaneously. Accordingly, embodiments of the present invention allow for the addition of multiple interpreters who may be needed to assist with the conversation interpretation. The discussion of the group may require an interpreter who is more experienced or well versed in a particular technology. The necessary interpreters may not all be located at the same relay system site and may need to call in using the multi-channel system of the present invention described herein. By using this dual communication channel system, interpreters other may be able to leave the call on not have everyone stuck on the second communication channel. Rather the desired media data can continue to be transmitted over the first communication channel efficiently, while the second communication channel is terminated.

It will be appreciated that this embodiment may be especially useful for team media calls when shared video is desired. For example, by using a second communication channel the first communication channel is preserved. This allows for a fallback if the remote teaming call fails to connect to an MCU over the second communication channel. The dual channel embodiments described herein also allow for either another attempt at remote team media conferencing or teaming or the communication session can continue over the first communication channel without teaming. Additionally, the first communication channel may allow for a more seamless and efficient first channel handoff between interpreters or other administrative tasks related to a VRS call, for example, without the need of interrupting the second communication channel.

Once the teaming and second channel are no longer needed, they can be disconnected and the first channel can be used again for communication. This also allows for the first communication channel be disconnected and established with a new Call Assistant to continue the communication session already established.

It will be appreciated that with a first communication channel call concurrently established with the second communication channel over MCU and the first communication channel available to transmit one or more kinds of media data, including protocol data, and technical difficulties or other issues with the media team conference call does not mean termination of the entire communication session and complete reestablishment Rather, the concurrently established first communication channel can quickly be used to continue the transfer of media data while certain team members may be invited to rejoin and may automatically rejoin the team conference call again on the second communication channel.

Figure 7:
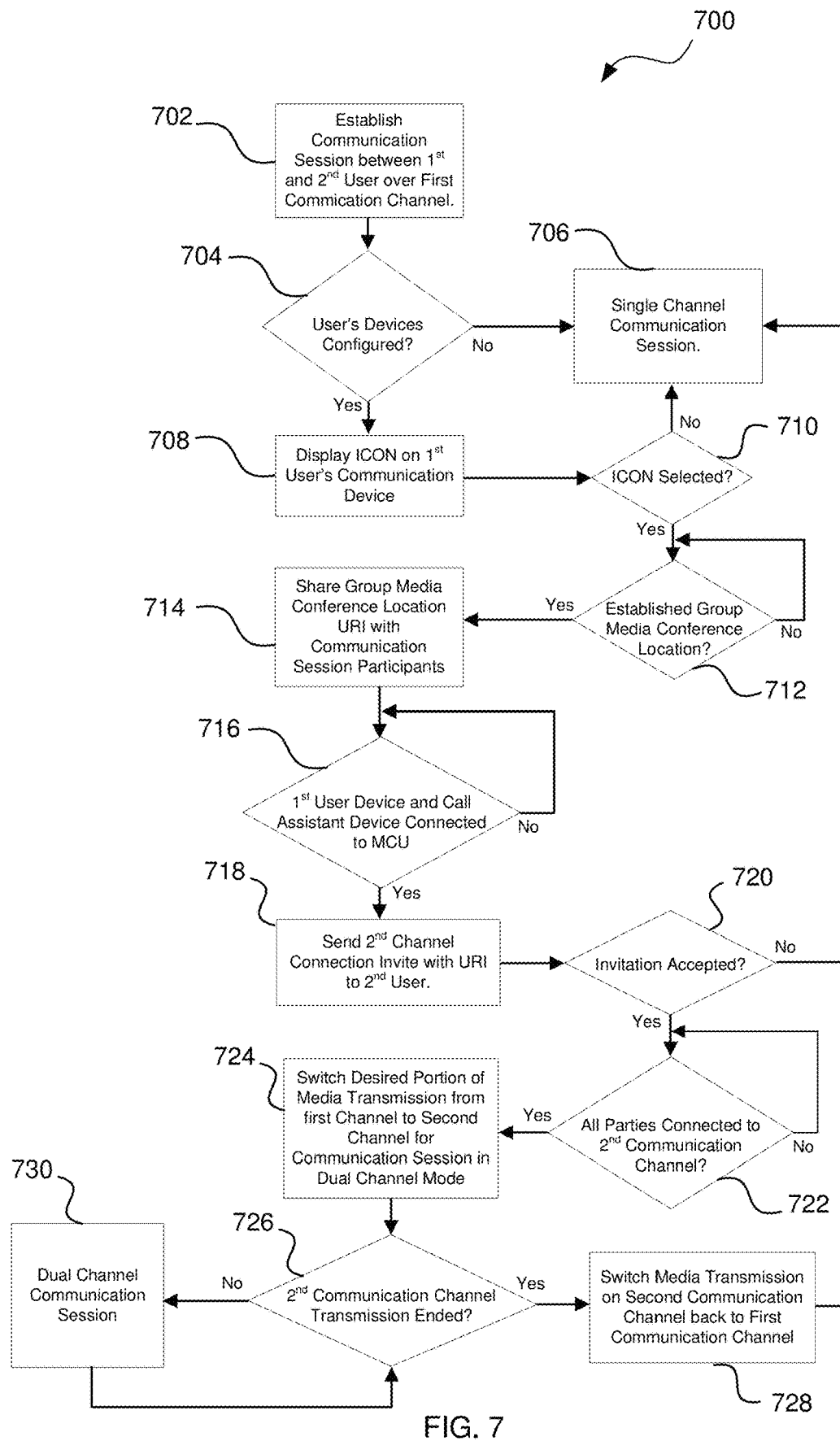
FIG. 7 is a schematic block diagram of a system workflow in accordance with one or more embodiments of the disclosure.

Referring now to FIG. 7, a flow chart 700 for one embodiment of a system for communication between an audibly-impaired user and an audibly-capable user is shown. The individual determination steps and action blocks of FIG. 7 may be the same or similar to the individual determination steps and action blocks described in conjunction with FIG. 6, where the communication participants of FIG. 6 are the audibly-impaired user, the audibly-capable user, and call assistant of FIG. 7. A request for communication between an audibly-impaired user and an audibly-capable user is made and a first communication channel that includes a relay system of the type herein described is established 702. The relay system includes a call assistant and a call assistant station device. As mentioned herein throughout, the establishment of the communication over the first communication channel may be established by one or more of the participants' communication devices, including the call assistant's station device, and/or the system directly or indirectly through one or more of its components. In this embodiment, the first communication channel may function like a VRS call, as described herein throughout.

With the first communication channel established 702, a determination 704 will be made to determine whether the communication session participants' devices are configured for use of the system. In one embodiment where the participants are an audibly-impaired user and an audibly-capable user, the audibly-impaired user's device may initiate the determination of whether one or both devices are registered (see FIGS. 2 and 3) and thus configured or capable of transmission over the second communication channel. In one embodiment, this determination may include validating that the audibly-capable user is connected over the first communication channel via a PTSN network. If one or more devices are not registered, the communication session continues 706 over the single channel as a VRS-type call.

The query into whether a user's device is registered for use with the system may be made using an embodiment of the back channel described herein (see FIGS. 2 and 3). In one embodiment, the audibly-impaired user's device queries the data base used to store the audibly-capable user's device registration information. (See FIG. 3). The audibly-impaired user's device may share the results of this query with the relay system and call assistant station device. If the query determines the audibly-capable user's device is registered the system may cause an icon to appear 708 on a display of the audibly-impaired user's device. If the icon isn't selected 710 by a communication session participant, which may in one embodiment be the audibly-impaired user, the communication session remains 706 a single channel call similar to a VRS call. It will be appreciated that the audibly-capable user's device may initiate the verification query and issue the invitation to join If the icon is selected by the audibly-impaired user, a check is made to determine 712 if a group media conference location is established. This determination may be accomplished and include the steps described in the similar step of FIG. 6. If not, the process of locating an available group media conference location may repeat until such time as there is availability. When there is availability, the URI location is shared 714 with communication participants including the audibly-impaired user, the audibly-capable user, and the call assistant. Step 714 may be accomplished in the same manner as step 614 of FIG. 6. The flow 700 then determines 716 whether the initiating user, be it the audibly-impaired user, the audibly-capable user, or the call assistant have connected their device to the MCU via the supplied URI. In the case where one of the audibly-impaired and audibly-capable users initiates use of the second channel, a determination 716 may be made to see whether the initiator and the call assistant has connected to the MCU. This may be done using the same process as described in conjunction with decision 616 described in FIG. 6.

Next is the flow 700 of FIG. 7, is the invitation 718 to either the audibly-impaired or audibly capable user to connect to the allocated space for the group media conference on the MCU using the appropriate URI. If the invitation is rejected, then the communication session remains established over initial first communication channel and may continue like a VRS call.

If the invitation is accepted, the invited user's device may, in one embodiment, use the transmitted URI to automatically create an outgoing call to join the group video conference room at the MCU. The invention and acceptance of the invitation may be accomplished in the same way that the invitation to, and acceptance by, the additional participant in FIG. 6 is accomplished. Once all parties are connected 722, the shared common media stream created by the MCU establishes the secondary or second communication channel. A portion of the media data shared between participants on the first communication channel ay be shared over the second communication channel. For example, it may be desirous to view video data over the MCU to conserve bandwidth, reduce coding time and issues, or other reasons. In this example, transmission of the video portion of the original communication session over the first communication channel may be switched 724 to the second communication channel. The flow 700 then determines 726 whether the second communication channel has ended or been terminate for reasons discussed herein throughout. If so, the portion of the media data being transmitted over the second communication channel may be switched back 728 to the first communication channel. If not, the communication session continues 730 with two communication channels being concurrently established. The video data transmission over the first communication channel may be paused for so long as desired or for so long as the video data transmission is being handled by the second communication channel.

Figure 8:
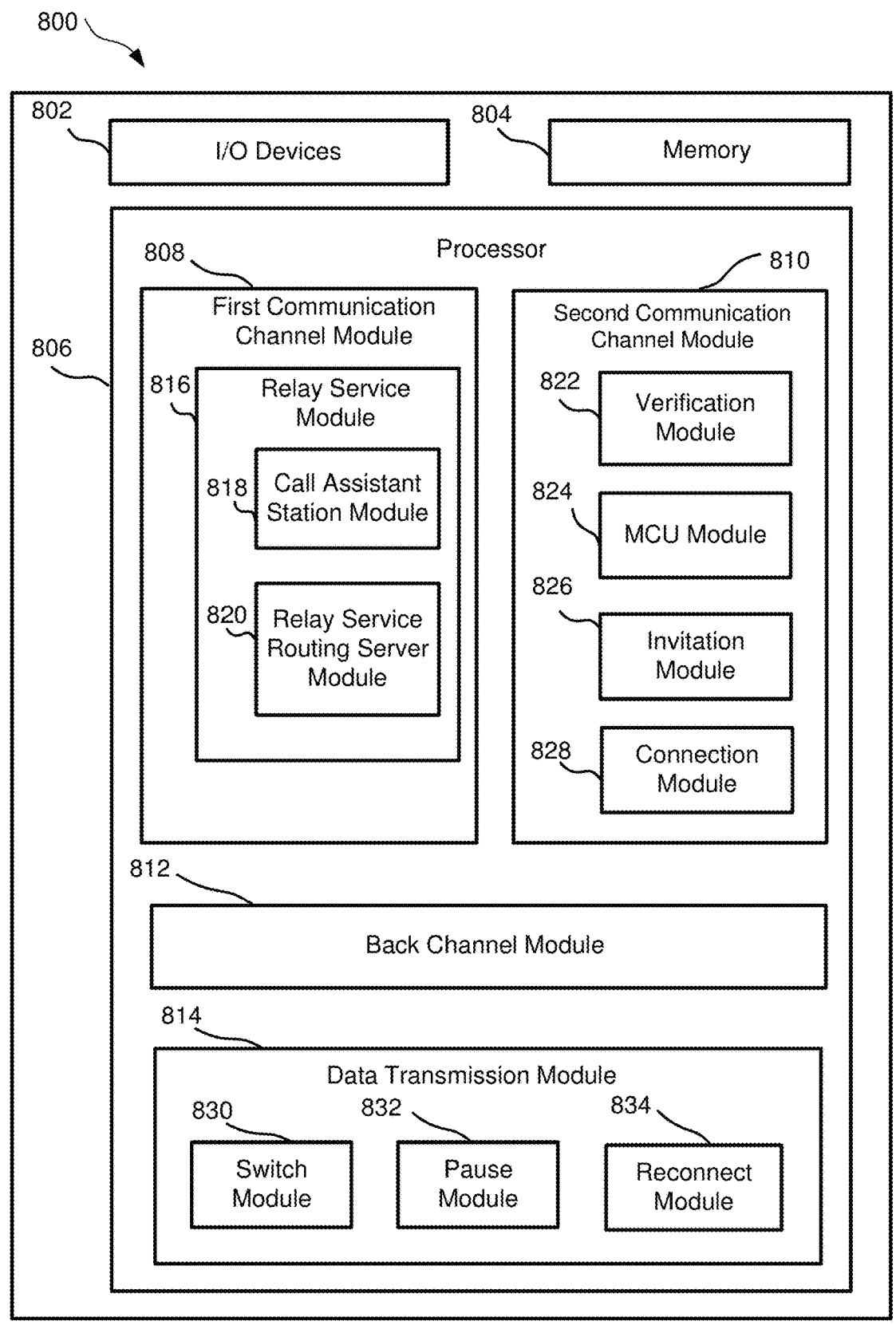
FIG. 8 is a schematic block diagram of various modules and components of a system for communication between parties in accordance with embodiments of the disclosure.

Turning now to FIG. 8, a non-transitory computer-readable medium storing program instructions that, when executed on one or more processors cause the instructions to perform operations to accomplish the method steps of FIG. 5, FIG. 10, and/or or any of the system functionality, processes, or configuration described herein throughout. The program instructions may be carried about any number of modules, including those shown in FIG. 9. System 800 may include I/O devices 802, including without limitation, cameras, microphones, remote controls, touch screens, keyboards, phones, computer screens, displays, speakers, and any other I/O device that could be used to establish a communication session including media data transmission. The system 800 may include a memory 804 capable of storing instructions such that when carried out by a processor, are capable of carrying out the operations to operate the apparatus and systems herein described, perform the methods, processes, and workflows described herein, and accomplish the benefits, advantages, and functionality described herein.

In one embodiment, a non-transitory computer-readable medium is configured to store code, software, and/or program instructions that, when executed on one or more processors, automatically adjust a brightness level of a videophone visual indicator. This code, software and/or program instructions may include the method steps, processes, functions, features, aspects and algorithms described herein. The code, software, program instructions, and in general, the implementing structures, may be in form of modules, which in one embodiment are stored on one or more processors 806.

In one embodiment, the modules include a first communication channel module 808, a second communication channel module 810, a back channel module 812, and a data transmission module 814. The first communication module 808 may include a relay service module 816 having a call assistant station module 818 and a relay service routing serer module 820. The first communication module 808 may be responsible for carrying out the functions, methods and processes necessary to provide translations services to communication sessions between audibly-impaired users and audibly-capable users. This module 808 may also be responsible for connecting communication session participants to each other over networks accessible over the first communication channel. The second communication channel module 810 may include a verification module 822, an MCU module 824, an invitation module 826 and a connection module 828. The second communication module may be responsible for finding space for, and setting up, a group media conference room on an MCU. If may be responsible for inviting users to join the MCU and verifying, if necessary, a device's prior registration or other requirements to join the MCU. The MCU may be responsible for instructions needed to connect all desired communication session participants to the MCU and combine participants' media streams, include video data, into a single stream of data accessible by all connected participants, thus establishing the second communication channel.

The back channel module 812 may be responsible for messaging, notifications, data base checking, accessing APIs, serverless code, SaaS, BaaS, FaaS, or CPaaS platforms or custom code, cloud communications and other administrative functions or processes.

The data transmission module 814 may include switch module 830, a pause module 832 and a reconnect module 834. The data transmission module 814 may be responsible for determining which communication session participants have access to which type of data over which communication channels. The data transmission module 814 may be responsible for pausing, termination, reconnecting, reestablishing and switching transmission of one or more types of media data over one or more of the communication channels described herein.

Figure 9:
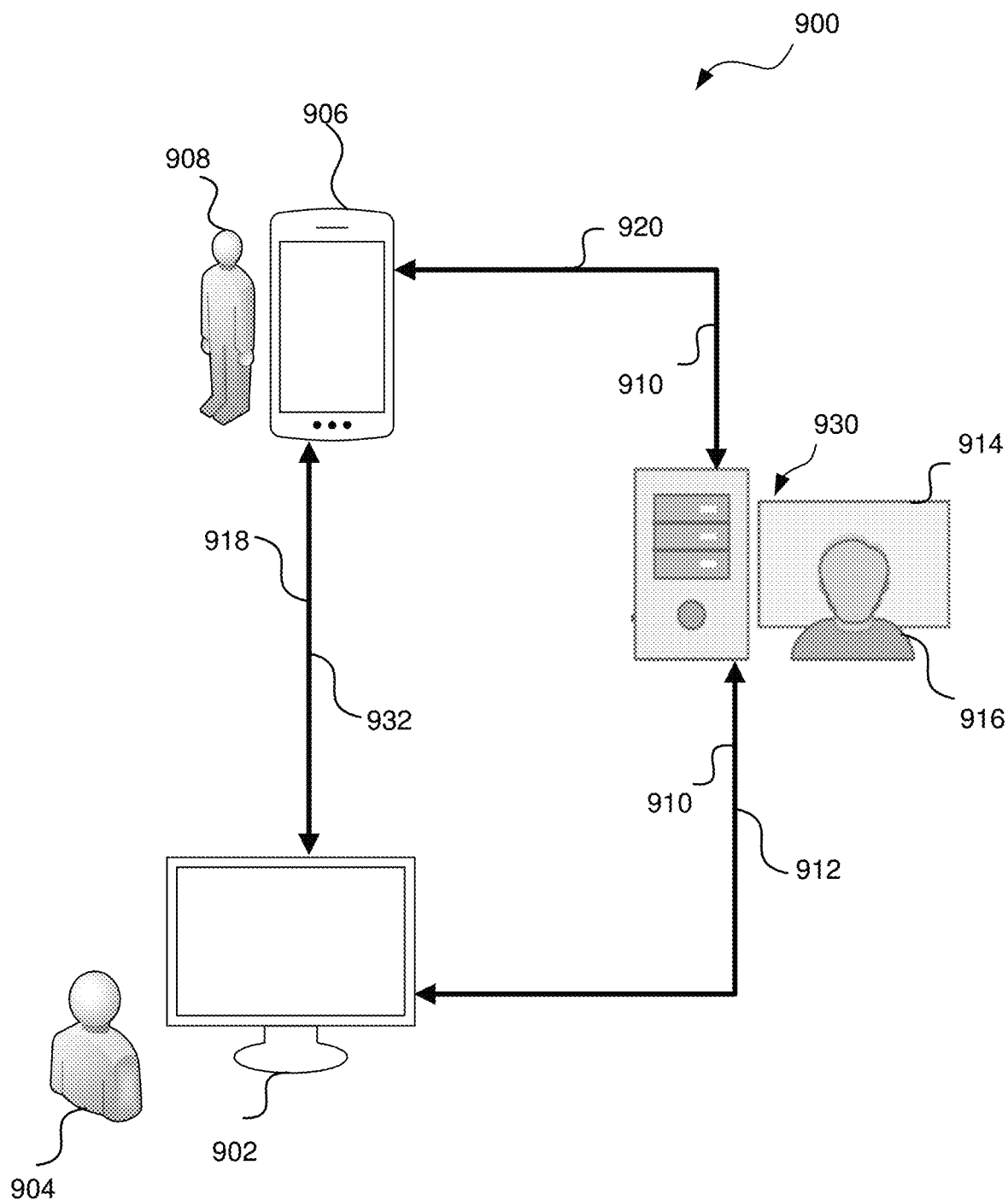
FIG. 9 a simplified schematic diagram of a communication system configured to enable media communication between parties in accordance with one or more embodiments of the disclosure.

Turning now to FIG. 9, one embodiment of a communication system 900 is shown. The system 900 may include a first communication device 902 associated with a first user 904, a second communication device 906 associated with a second user 908, and a third communication device 914 associated with a third user 916. The system 900 may include a first communication channel 910. In one embodiment, the first communication channel 910 includes a media transmission line 912 between the first communication device 902 and the third communication device 914. The first communication channel 910 further includes a media transmission line 920 between the third communication device 914 and the second communication device 906. The first communication channel 910 may be configured to transmit media data between the first communication device 902 and the second communication device 906 through the third communication device 914.

The system 900 may also include a second communication channel 932. The second communication channel 932 may include a media transmission line 918 between the first communication device 902 and the second communication device 906. The first and second communication channels are configured to be established concurrently with one another. In one embodiment, the second communication channel 932 includes an MCU (not shown).

In one embodiment, the third user 916 may be a call assistant 916 that is part of a relay system 930 used to translate sign language and voice between the first user 904 and the second user 908. In this embodiment, the first user 904 may establish a communication session with the second user 908 over the first communication channel 910. In an embodiment where the first user his hearing-impaired and the second user is hearing-capable, the communication session may include transmitting media data between the first user 904 and the call assistant 916 over transmission line 912. The media data may include one or more of visual data including video data, audio data including voice data, and alphanumeric data including text data. The communication session over the first communication channel 910 may also include transmitting voice data over between the call assistant station device 914 and the second communication device 906 using transmission line 920. In this embodiment configuration, the call assistant 916 may see the hearing-impaired user 904 signing by video data transmission over line 912. The call assistant 916 may then speak the translated words to the hearing-capable user 908 over transmission line 920, which may be a standard phone line capable of transmitting audio data. The hearing-capable user 908 may speak voice data over line 920, which the call assistant 916 translates into sign language. The call assistant's signing motions are captured as video data and transmitted back to the hearing-impaired user 904 over line 912, which data is received by the first communication device 902. In this embodiment, a first communication channel 910 may be include transmission lines 912 and 920 and the first communication channel may function as a VRS call.

In one embodiment, the establishment of the first and second video lines may be the same as have been described herein throughout with the exception that the second user 908 isn't invited to call an MCU, but rather, to call the first user over a video phone line. The communication devices 902, 906, and 914 may be configured with the same capabilities, functionality, and features as other communication devices described herein. System 900 may also include a back channel (not shown) for performing the functions and processes described in conjunction with other systems described herein. The methods of operation and workflows described herein may also apply to system 900 with the MCU in those system descriptions being equated to one or more of the user devices 902 and 906.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

The scope of the present invention is defined by the appended claims.

What is claimed is:

1. A system for communicating between parties, comprising:
 a first communication device associated with a first user;
 a second communication device associated with a second user;
 a first communication channel between the first user and the second user, the first communication channel configured to transmit at least one of call data and media data between the first communication device and the second communication device, wherein the first communication channel comprises an implementing structure to facilitate the transmission of at least one of call data and media data between the first communication device and the second communication device; and
 a second communication channel between the first user and the second user, the second communication channel configured to transmit media data between the first communication device and the second communication device, wherein the first communication channel and the second communication channel are configured to be established concurrently with each other, wherein the second communication channel is separate from the first communication channel, wherein the second communication channel comprises an MCU, and wherein the MCU of the second communication channel is not the implementing structure of the first communication channel.

2. The system of claim 1, wherein the second communication channel is configured to transmit media data between the first communication device, the second communication device, and one or more additional communication devices.

3. The system of claim 1, wherein the first communication channel comprises a relay system for providing translation services during a communication session between the first user and the second user, the relay system comprising a call assistant station device associated with a call assistant, wherein the first communication channel is configured transmit at least video data between the first communication device and the call assistant station device and voice data between second communication device and the call assistant station device.

4. The system of claim 3, wherein the first communication channel comprises a relay system routing server configured to facilitate the transmission of one or more of video data, audio data, and text data between the first communication device and the call assistant station device over the first communication channel and to facilitate the transmission of voice data between the second communication device and the call assistant station device over the first communication channel, and wherein the relay system routing server of the first communication channel is not the same as the MCU of the second communication channel.

5. The system of claim 3, wherein the MCU is configured to transmit video data between the first communication device and the call assistant station device and to transmit video data between the second communication device and the call assistant station device.

6. The system of claim 3, further configured to use one or both of the first and second communication channels to transmit video data between the first communication device and the call assistant station device.

7. The system of claim 3, further configured to switch back and forth between the first and second communication channels allowing the system to selectively transmit video data between the first communication device and the call assistant station device over either or both of said first and second communication channels.

8. The system of claim 3, wherein the system is configured such that a termination of data transmission over the first communication channel terminates data transmission over the second communication channel.

9. The system of claim 3, wherein the system is configured such that a termination of data transmission over the second communication channel does not terminate data transmission over the first communication channel.

10. The system of claim 3, wherein the first communication device is configured to display video data from at least the second communication device and the call assistant station device simultaneously, wherein the second communication device is configured to display video data from at least the first communication device and the call assistant station device simultaneously, and wherein the call assistant station device is configured to display video data from at least the first communication device and the second communication device simultaneously.

11. The system of claim 3, wherein the second communication channel is configured to transmit media data between the first communication device, the second communication device, and one or more additional communication devices.

12. A first communication device configured to facilitate a communication session between a first user using the first communication device and a second user using a second communication device, the communication device comprising:
 a memory configured to store instructions; and
 a processor operatively coupled with the memory and configured to execute the instructions to perform operations, the operations comprising:
  requesting a communication session between the first communication device and the second communication device;
  establishing a first communication channel, wherein the first communication channel comprises an implementing structure to facilitate the transmission of at least one of call data and media data between the first communication device and the second communication device;
  establishing a second communication channel concurrently with the first communication channel, the second communication channel comprising an MCU, wherein the second communication channel configured to transmit media data between the first communication device and the second communication device, and wherein the MCU of the second communication channel is not the implementing structure of the first communication channel; and
  selectively switching the transmission of desired media data between the first communication channel and the second communication channel.

13. The first communication device of claim 12, wherein the first communication channel comprises a relay system comprising a call assistant station device associated with a call assistant, the first communication channel configured to transmit at least video data between the first communication device and the call assistant station device and voice data between second communication device and the call assistant station device.

14. The first communication device of claim 13, wherein the operations further comprise: receiving video data from the second communication device over the second communication channel and receiving video data from the call assistant station device over one or more of the first communication channel and the second communication channel.

15. The first communication device of claim 13, wherein the operations further comprise, displaying video data from the second communication device and video data from the call assistant station device simultaneously on a first communication device display.

16. The first communication device of claim 12, wherein operations for establishing a second communication channel concurrently with the first communication channel further comprise operations for sending an electronic invite to the second communication device to connect with the first communication device over the second communication channel.

17. The first communication device of claim 16, wherein operations to send an electronic invite further comprise operations for determining whether the second communication device is configured for communication over the second communication channel.

18. A second communication device configured to facilitate a communication session between a first user at a first communication device and a second user at the second communication device, the communication device comprising:
 a memory configured to store instructions; and
 a processor operatively coupled with the memory and configured to execute the instructions to perform operations, the operations comprising:
  requesting a communication session between the first communication device and the second communication device;
  establishing a first communication channel, wherein the first communication channel comprises an implementing structure to facilitate the transmission of at least one of call data and media data between the first communication device and the second communication device;
  establishing a second communication channel concurrently with the first communication channel, the second communication channel comprising an MCU, wherein the second communication channel is configured to transmit media data between the first communication device and the second communication device, and wherein the MCU of the second communication channel is not the implementing structure of the first communication channel; and
  selectively switching the transmission of desired media data between the first communication channel and the second communication channel.

19. The second communication device of claim 18, wherein the first communication channel comprises a relay system comprising a call assistant station device associated with a call assistant, the first communication channel configured to transmit voice data between the second communication device and the call assistant station device and transmit at least video data between the call assistant station device and the first communication device.

20. The second communication device of claim 19, wherein the operations further comprise: receiving video data from the first communication device over the second communication channel and receiving voice data from the call assistant station device over the first communication channel.

21. The second communication device of claim 19, wherein the operations further comprise, displaying video data from the first communication device and video data from the call assistant station device simultaneously on a second communication device display.

22. The second communication device of claim 18, wherein operations for establishing a second communication channel concurrently with the first communication channel further comprise operations for:
configuring the second communication device for communication over the second communication channel; and
accepting an electronic invite from the first communication device to connect with the first communication device over the second communication channel.

23. A method of communication between parties, the method comprising:
establishing a first communication channel between a first communication device associated with a first user and a second communication device associated with a second user, wherein the first communication channel comprises an implementing structure to facilitate the transmission of at least one of call data and media data between the first communication device and the second communication device;
establishing a second communication channel between the first communication device and the second communication device concurrently with the first communication channel, wherein the second communication channel is configured to transmit video data between the first communication device and the second communication device, wherein the second communication channel comprises an MCU, and wherein the MCU of the second communication channel is not the implementing structure of the first communication channel; and
selectively switching the transmission of desired media data between the first communication channel and the second communication channel.

24. The method of claim 23, wherein selectively switching the transmission of desired media data between the first communication channel and the second communication channel comprises making at least one determination from the determinations comprising:
determining whether one of more of the first and second communication devices desires to stop sending and/or receiving media data over one or more of the first and second communication channels;
determining whether one of more of the first and second communication devices is unable to transmit call data over one or more of the first and second communication channels;
determining whether one or more of the first and second communication channels is unable to transmit media data; and
determining whether transmission of media data over the first or second communication channels is in violation of an FCC regulation.

25. The method of claim 23, wherein the first communication channel comprises a relay system comprising a call assistant station device associated with a call assistant, the first communication channel configured to transmit at least video data between the first communication device and the call assistant station device and voice data between second communication device and the call assistant station device.

26. The method of claim 23, wherein establishing a second communication channel comprises determining whether the second communication device is configured for communication over the second communication channel.

27. The method of claim 23, wherein establishing a second communication channel comprises finding an available group video conferencing site on an MCU.

28. The method of claim 23, wherein establishing a second communication channel comprises sharing a URI of an available group media conferencing site on an MCU with at least the first communication device and the second communication device.

29. The method of claim 23, wherein establishing a second communication channel comprises connecting at least the first communication device and the second communication device to the MCU.

30. The method of claim 25, wherein establishing a second communication channel comprises sharing a URI of an available group media conferencing site on an MCU with at least the first communication device, the second communication device, and the call assistant station device.

31. The method of claim 25, wherein establishing a second communication channel comprises connecting at least the first communication device, the second communication device, and the call assistant station device to the MCU.

32. A system comprising:
a memory configured to store instructions; and
a processor operatively coupled with the memory and configured to execute the instructions to perform operations, the operations comprising:
establishing a first communication channel between a first communication device associated with a first user and a second communication device associated with a second user, wherein the first communication channel comprises a relay system routing server and a call assistant station device associated with a call assistant, the first communication channel configured to transmit at least video data between the first communication device and the call assistant station device and voice data between second communication device and the call assistant station device;
establishing a second communication channel between the first communication device and the second communication device concurrently with the first communication channel, wherein the second communication channel is configured to transmit video data between the first communication device and the second communication device, wherein the second communication channel comprises an MCU, and wherein the MCU of the second communication channel is not the implementing structure of the first communication channel; and selectively switching the transmission of media data between the first communication device and the second communication channel.

33. The system of claim 32, wherein the operation of selectively switching the transmission of desired media data between the first communication channel and the second communication channel comprises the operation of making at least one determination from the determinations comprising:
- determining whether one of more of the first and second communication devices desires to stop sending and/or receiving media data over one or more of the first and second communication channels;
- determining whether one of more of the first and second communication devices is unable to transmit call data over one or more of the first and second communication channels;
- determining whether one or more of the first and second communication channels is unable to transmit media data; and
- determining whether transmission of media data over the first or second communication channels is in violation of an FCC regulation.

34. The system of claim 32, wherein the operations for establishing a second communication channel comprise operations for determining whether the second communication device is configured for communication over the second communication channel.

35. The system of claim 32, wherein the operations for establishing a second communication channel comprise operations for finding an available group video conferencing site on an MCU.

36. The system of claim 32, wherein the operations for establishing a second communication channel comprise operations for sharing a URI of an available group video conferencing site on an MCU with at least the first communication device and the second communication device.

37. The system of claim 32, wherein the operations for establishing a second communication channel comprise operations for connecting at least the first communication device and the second communication device to the MCU.

38. A non-transitory computer-readable medium storing program instructions that, when executed on one or more processors cause the instructions to perform operations, the operations comprising:
- establishing a first communication channel between a first communication device associated with a first user and a second communication device associated with a second user, wherein the first communication channel comprises an implementing structure to facilitate the transmission of at least one of call data and media data between the first communication device and the second communication device;
- establishing a second communication channel between the first communication device and the second communication device concurrently with the first communication channel, wherein the second communication channel is configured to transmit media data between the first communication device and the second communication device, wherein the second communication channel comprises an MCU, and wherein the MCU of the second communication channel is not the implementing structure of the first communication channel; and
- selectively switching the transmission of media data between the first communication channel and the second communication channel.

39. A system for communicating between parties, comprising:
- a first communication device associated with a first user;
- a second communication device associated with a second user;
- a third communication device associated with a third user;
- a first communication channel, the first communication channel comprising a media transmission line between the first communication device and the third communication device and a media transmission line between the third communication device and the second communication device, the first communication channel comprising an implementing structure to facilitate the transmission of at least one of call data and media data between the first communication device and the second communication device through the third communication device; and
- a second communication channel, the second communication channel comprising a media transmission line between the first communication device and the second communication device, the first and second communication channels being established concurrently, and wherein the second communication channel comprises an MCU, and wherein the MCU of the second communication channel is not the implementing structure of the first communication channel.

40. A method of communication between parties, the method comprising:
- establishing a first communication channel between a first communication device associated with a first user and a second communication device associated with a second user, the first communication channel configured to transmit at least one of call data and media data between the first communication device and the second communication device;
- establishing a second communication channel between the first communication device and the second communication device concurrently with the first communication channel, wherein the second communication channel is configured to transmit video data between the first communication device and the second communication device, wherein the second communication channel comprises an MCU; and
- selectively switching the transmission of desired media data between the first communication channel and the second communication channel, wherein selectively switching the transmission of desired media data between the first communication channel and the second communication channel comprises making at least one determination from the determinations comprising:
  - determining whether one of more of the first and second communication devices desires to stop sending and/or receiving media data over one or more of the first and second communication channels;
  - determining whether one of more of the first and second communication devices is unable to transmit call data over one or more of the first and second communication channels;
  - determining whether one or more of the first and second communication channels is unable to transmit media data; and
  - determining whether transmission of media data over the first or second communication channels is in violation of an FCC regulation.

41. A system comprising:
a memory configured to store instructions; and a processor operatively coupled with the memory and configured to execute the instructions to perform operations, the operations comprising:
  establishing a first communication channel between a first communication device associated with a first user and a second communication device associated with a second user, wherein the first communication channel comprises a relay system routing server and a call assistant station device associated with a call assistant, the first communication channel configured to transmit at least video data between the first communication device and the call assistant station device and voice data between second communication device and the call assistant station device;
  establishing a second communication channel between the first communication device and the second communication device concurrently with the first communication channel, wherein the second communication channel is configured to transmit video data between the first communication device and the second communication device, wherein the second communication channel comprises an MCU; and
  selectively switching the transmission of media data between the first communication device and the second communication channel, wherein selectively switching the transmission of desired media data between the first communication channel and the second communication channel comprises making at least one determination from the determinations comprising:
    determining whether one of more of the first and second communication devices desires to stop sending and/or receiving media data over one or more of the first and second communication channels;
    determining whether one of more of the first and second communication devices is unable to transmit call data over one or more of the first and second communication channels;
    determining whether one or more of the first and second communication channels is unable to transmit media data; and
    determining whether transmission of media data over the first or second communication channels is in violation of an FCC regulation.

* * * * *